United States Patent
Amano

(10) Patent No.: US 8,218,053 B2
(45) Date of Patent: Jul. 10, 2012

(54) IMAGE DISPLAY APPARATUS WITH HOLDING MEMBER

(75) Inventor: Hiromi Amano, Osaka (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 12/093,116

(22) PCT Filed: Dec. 6, 2006

(86) PCT No.: PCT/JP2006/324363
§ 371 (c)(1), (2), (4) Date: May 8, 2008

(87) PCT Pub. No.: WO2007/072685
PCT Pub. Date: Jun. 28, 2007

(65) Prior Publication Data
US 2009/0096908 A1 Apr. 16, 2009

(30) Foreign Application Priority Data
Dec. 21, 2005 (JP) .................................. 2005-367698

(51) Int. Cl.
*H04N 5/222* (2006.01)

(52) U.S. Cl. ..................................... 348/333.01; 349/58

(58) Field of Classification Search ............. 348/333.01, 348/333.06, 333.07; 349/58
See application file for complete search history.

(56) References Cited

U.S. PATENT DOCUMENTS

| | | | |
|---|---|---|---|
| 5,274,486 A | 12/1993 | Yamazaki et al. | |
| 6,507,377 B1 | 1/2003 | Jung | |
| 6,879,318 B1 * | 4/2005 | Chan et al. | 345/173 |
| 6,885,411 B2 * | 4/2005 | Ogawa et al. | 349/58 |
| 2004/0201792 A1 * | 10/2004 | Saitoh et al. | 349/58 |
| 2005/0185116 A1 | 8/2005 | Higashi et al. | |

FOREIGN PATENT DOCUMENTS

| | | |
|---|---|---|
| JP | 2001-060066 A | 3/2001 |
| JP | 2003-215701 A | 7/2003 |
| JP | 2004-325573 A | 11/2004 |
| JP | 2005-208492 | 8/2005 |

* cited by examiner

*Primary Examiner* — Nelson D. Hernández Hernández
(74) *Attorney, Agent, or Firm* — Hamre, Schumann, Mueller & Larson, P.C.

(57) ABSTRACT

An image display device includes an LCD panel 102, a BL unit 150 having a first contact plane to be in contact with a display plane of the LCD panel 102, and a LCD holding piece 101 having a second contact plane to be in contact with a plane of the LCD panel 102 opposed to the display plane, wherein the LCD holding piece 101 includes a biasing portion (an elastic support portion 101*b* and holding piece elastic arms 101*i*) biasing the BL unit 150, and the BL unit 150 is biased in a direction of the LCD holding piece 101 by the biasing portion. According to this configuration, an image display device can be provided in which foreign matter is suppressed from being generated by the contact between an EVF panel and a housing or foreign matter is suppressed from moving to an image display range during an assembly process.

6 Claims, 13 Drawing Sheets

IMAGE DISPLAY APPARATUS WITH HOLDING MEMBER

TECHNICAL FIELD

The present invention relates to an image display device that is mounted on a video camera, a still camera, a mobile telephone terminal, or the like, and is capable of displaying an image, etc. In particular, the present invention relates to an image display device such as an electric viewfinder (hereinafter, referred to as an EVF) and a liquid crystal monitor.

BACKGROUND ART

Recently, an image display device constituted by a liquid crystal display device (hereinafter, referred to as an LCD panel) is mounted on a video camera and a digital still camera. In order to display an image of the LCD panel visually, a light-emitting unit with a light source such as a backlight (hereinafter, referred to as a BL) mounted thereon is required for illuminating one surface of the LCD panel. More specifically, the image display device is composed of a combination of the LCD panel and the light-emitting unit. In this case, if foreign matter adheres to an image display range of the LCD panel or the light-emitting unit, the foreign matter blocks a part of transmitted light and causes a display defect of an image. Particularly, in a device displaying an image in an enlarged state with an optical lens as in the EVF, adhering foreign matter is likely to cause a display defect of an image, even though the foreign matter is minute.

Therefore, various means such as the configuration of preventing the mixing of foreign matter in an image display device and the configuration of preventing the movement, adhesion, or the like of foreign matter to an image display range have been proposed.

Conventionally, in order to prevent the mixing or the like of foreign matter in an image display device, an image display device described in Patent Document 1 is known. FIG. 9 is an exploded perspective view of a conventional image display device. In FIG. 9, the image display device includes an EVF panel 2, a polarizing plate 4, a housing upper portion 5, a housing lower portion 6, a flexible substrate 10, and a flexible substrate pressure portion 7. FIG. 10 is a perspective view of the housing lower portion 6. The housing lower portion 6 includes an EVF panel insertion portion 12, and a polarizing plate insertion portion 13.

As shown in FIGS. 9 and 10, the EVF panel insertion portion 12 is formed of convex portions with an interval substantially equal to the thickness of the EVF panel 2, and the polarizing plate insertion portion 13 is formed so as to close an opening 14 when the polarizing plate 4 is inserted in the polarizing plate insertion portion 13. After the EVF panel 2 is inserted in the EVF panel insertion portion 12, and the polarizing plate 4 is inserted in the polarizing plate insertion portion 13, the housing upper portion 5 is engaged with the housing lower portion 6.

Thus, foreign matter such as dust is prevented from adhering to an interface between the EVF panel 2 and the polarizing plate 4 by spacing the EVF panel 2 and the polarizing plate 4 and placing the EVF panel 2 in a substantially sealed section.
Patent Document 1: JP 2005-208492 A

DISCLOSURE OF INVENTION

Problem to be Solved by the Invention

However, according to the configuration disclosed by Patent Document 1, the EVF panel 2 is configured in such a manner that a pair of glass substrates, each having electrodes on an inner surface, are attached to each other with a liquid crystal material interposed therebetween. Therefore, it is difficult to maintain the thickness of the EVF panel 2 and the size precision in a plane direction of the glass substrates. Therefor, it is necessary to form the EVF panel insertion portion 12 at a position where even the EVF panel 2 with a maximum size of a variation can be accommodated. This enlarges the clearance between the EVF panel insertion portion 12 and the outer shape of the EVF panel 2, and the EVF panel 2 moves during or after assembly due to the lack of a friction force between planes. If the EVF panel 2 moves, a sharp glass end face thereof damages the housing lower portion 6, which may shave the housing lower portion 6.

Particularly, when the flexible substrate 10 is bent along a bottom surface of the housing lower portion 6 and held by being pressed with the flexible substrate pressure portion 7, the EVF panel 2 may move in a direction opposite to the flexible substrate 10 while being tilted in a thickness direction by the clearance between the EVF panel insertion portion 12 and the EVF panel 2. Then, an end face edge of the EVF panel 2 is engaged in the surface of the EVF panel insertion portion 12, with the result that the housing lower portion 6 is shaved. When foreign matter such as debris generated by the shaving of the housing lower portion 6 moves to an image display range, a display defect of an image is caused.

In view of the above problem, an object of the present invention is to provide an image display device suppressing the generation of foreign matter caused by the contact between an EVF panel and a housing during assembly or the movement of foreign matter to an image display range.

Means for Solving Problem

In order to achieve the above object, a first image display device of the present invention includes an image display device; a lid having a first contact plane to be in contact with a display plane of the image display device; and a holding member having a second contact plane to be in contact with a plane of the image display device opposed to the display plane, wherein the holding member includes a biasing portion that biases the lid, and the lid is biased in a direction of the holding member by the biasing portion.

Furthermore, a second image display device of the present invention includes an image display device; a lid having a first contact plane to be in contact with a display plane of the image display device; and a holding member having a second contact plane to be in contact with a plane of the image display device opposed to the display plane, wherein the lid includes a biasing portion that biases the holding member, and is biased in a direction of the holding member by the biasing portion.

Effects of the Invention

In the image display device of the present invention, an image display device is pressed in a direction normal to a contact plane of a holding member, and can be fixed by a friction force between planes, and an end face edge of the image display device is unlikely to be engaged with the contact plane and is unlikely to shave it. Thus, the generation of foreign matter can be suppressed, and the frequency of a display defect of an image can be reduced remarkably.

DESCRIPTION OF REFERENCE NUMERALS

101 LCD holding piece (holding member)
101b elastic support portion (biasing portion)
101e LCD receiving plane (first contact plane)
101i holding piece elastic arm (biasing portion)
102 LCD panel (image display device)
103 BL piece (display device side lid)
105 BL polarizing plate
106 LCD pressure piece (light source side lid)
106c LCD contact plane (second contact plane)
106d polarizing plate contact plane (third contact plane)
150 BL unit (lid)

DESCRIPTION OF THE INVENTION

The image display device of the present invention can be configured so that an area defined by an outer periphery of the second contact plane is equal to or smaller than an area defined by an outer periphery of the image display device. According to this configuration, an edge of the image display device can be prevented from rubbing against the second contact plane, so that the generation of foreign matter such as debris can be prevented.

Furthermore, an area defined by an outer periphery of the first contact plane can be equal to or smaller than an area defined by an outer periphery of the image display device. According to this configuration, an edge of the image display device can be prevented from rubbing against the first contact plane, so that the generation of foreign matter such as debris can be prevented.

Furthermore, the lid can be accommodated in the holding member. According to this configuration, the length of the image display device in an optical axis direction can be decreased, which can miniaturize the image display device.

Furthermore, the lid can include an opening transmitting a light beam emitted by a light source.

Furthermore, the lid can include a light source side lid on a side of the light source, and a display device side lid on a side of the image display device, the image display device can include a polarizing plate between the light source side lid and the display device side lid, and an area defined by an outer periphery of a third contact plane to be in contact with the display device side lid and the polarizing plate can be equal to or smaller than an area defined by an outer periphery of the polarizing plate. According to this configuration, an edge of the polarizing plate can be prevented from rubbing against the third contact plane, so that the generation of foreign matter such as debris can be prevented.

Embodiment 1

[1. Basic Configuration of an Image Display Device]

Figure 1:
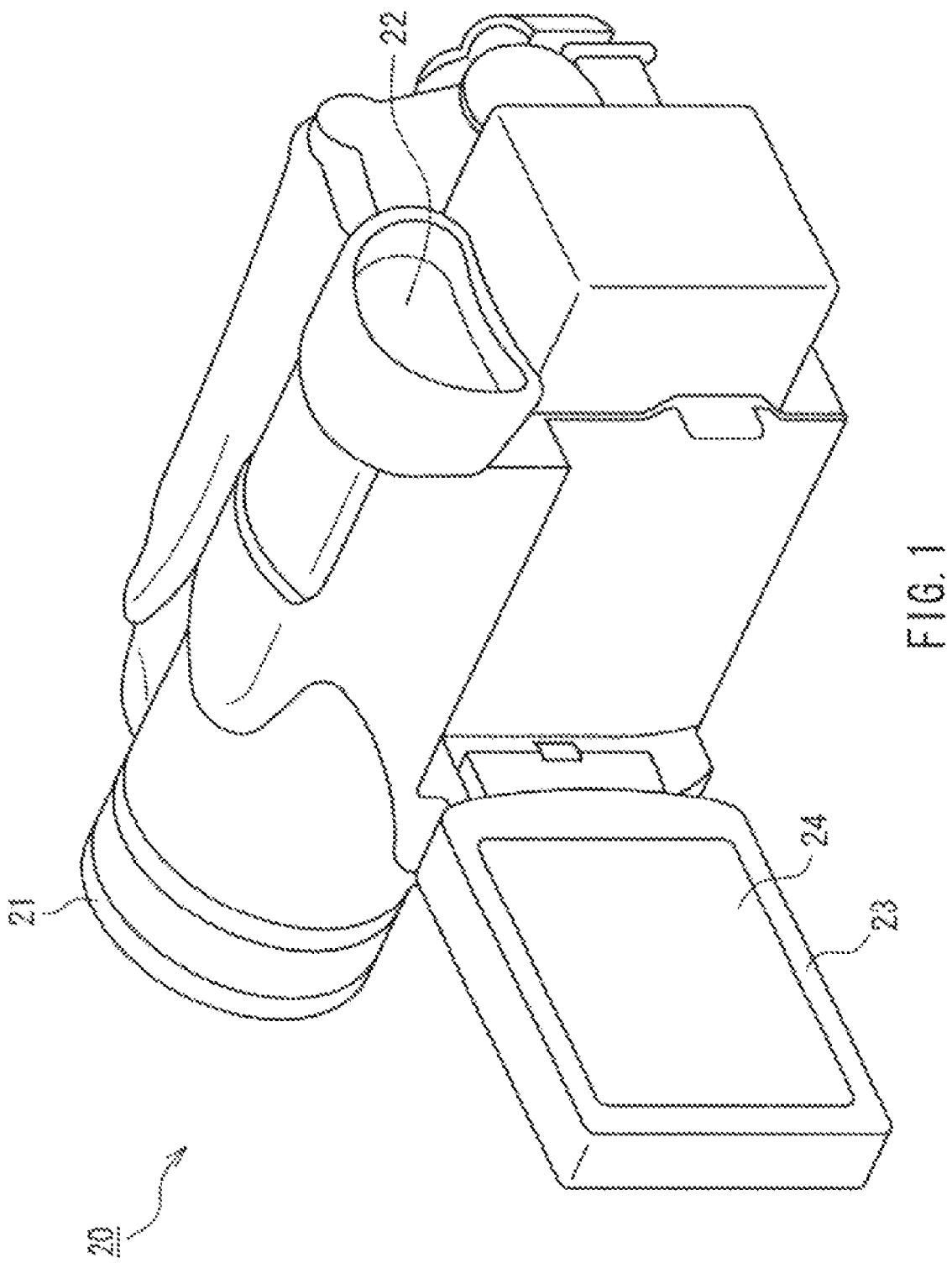
FIG. 1 is a perspective view showing an outer appearance of an image pickup apparatus with an image display device in Embodiment 1 mounted thereon.
Figure 2A:
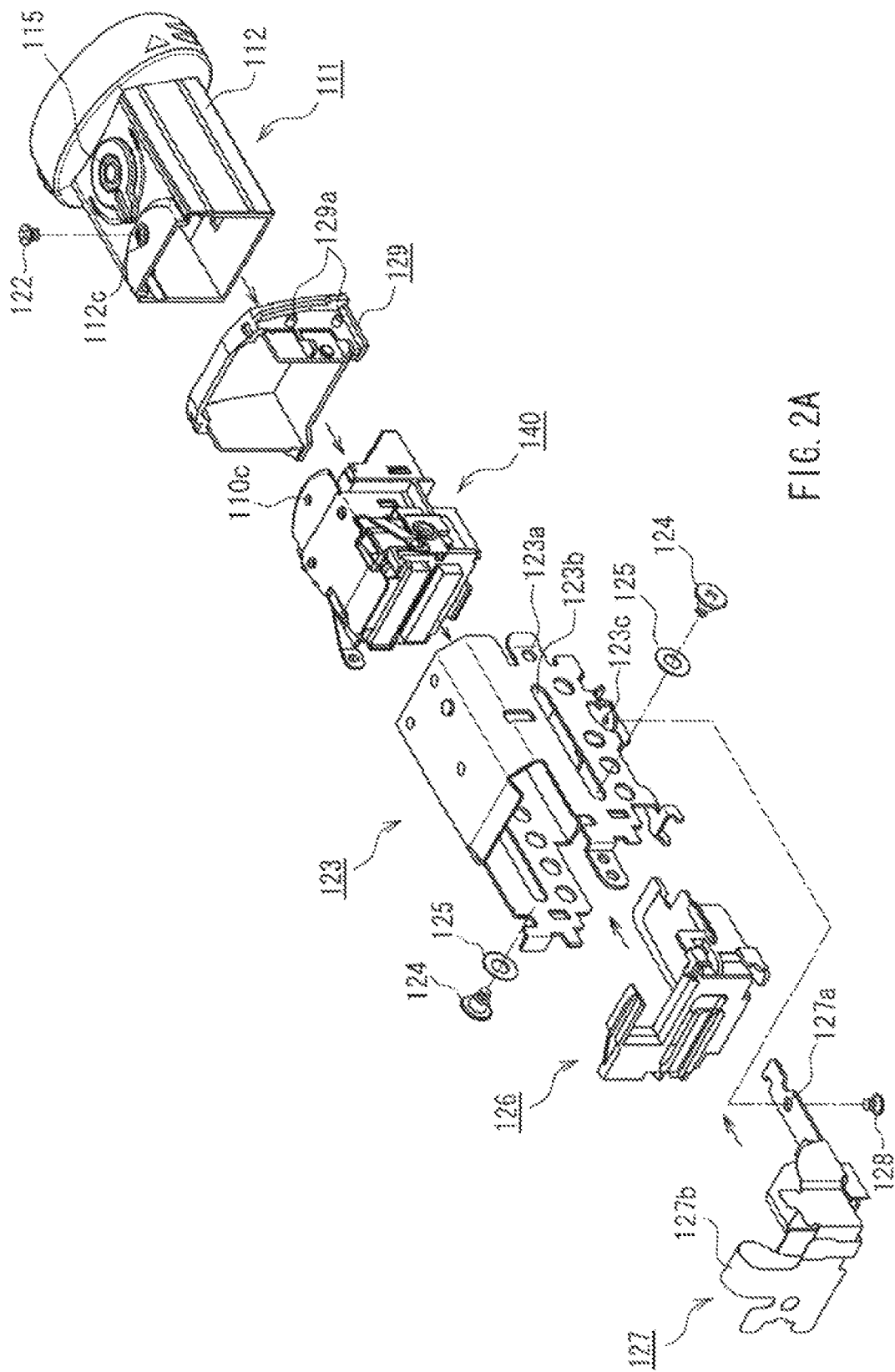
FIG. 2A is an exploded perspective view of the image display device in Embodiment 1.
Figure 2B:
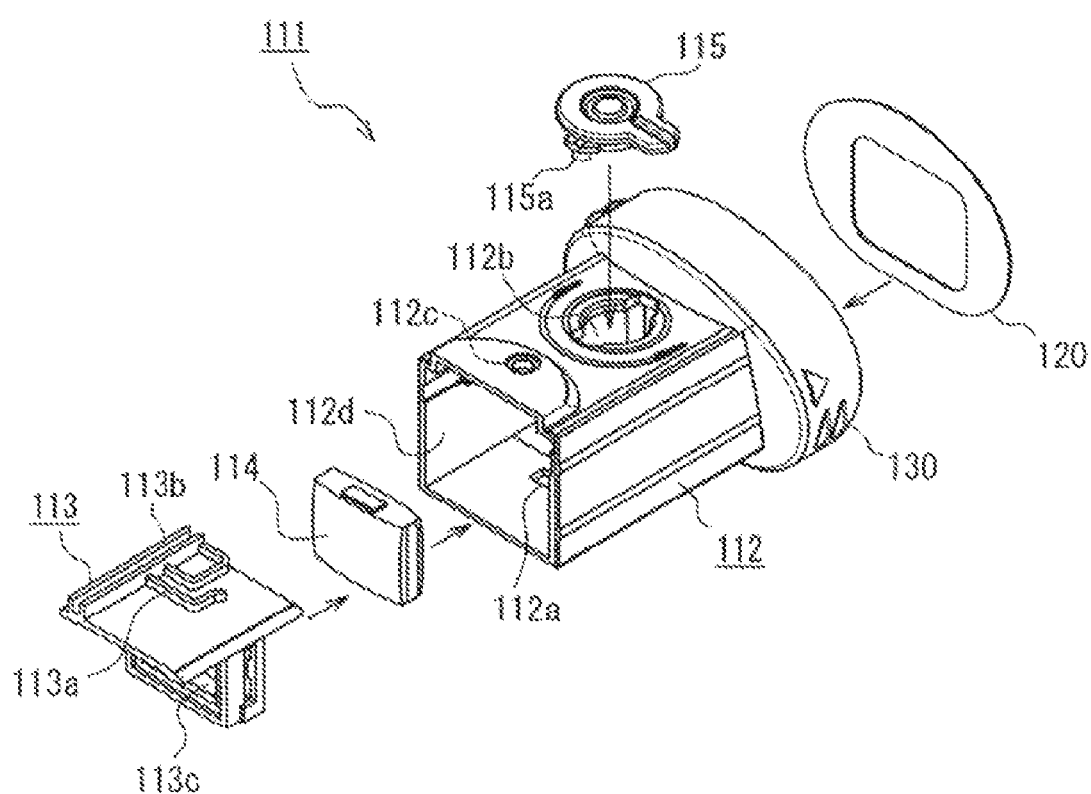
FIG. 2B is an exploded perspective view of a visibility adjustment unit in Embodiment 1.
Figure 2C:
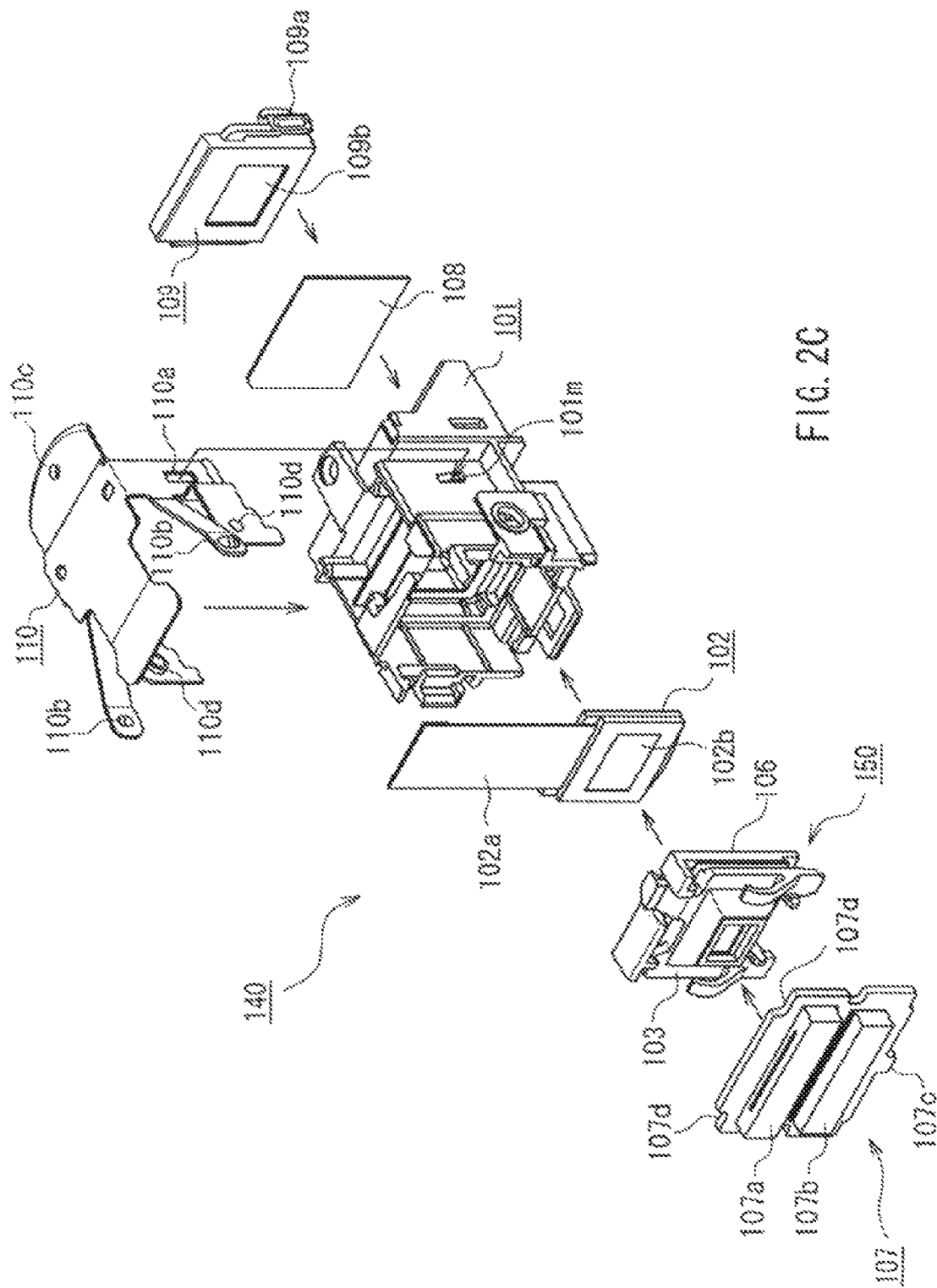
FIG. 2C is an exploded perspective view of an LCD unit in Embodiment 1.
Figure 2D:
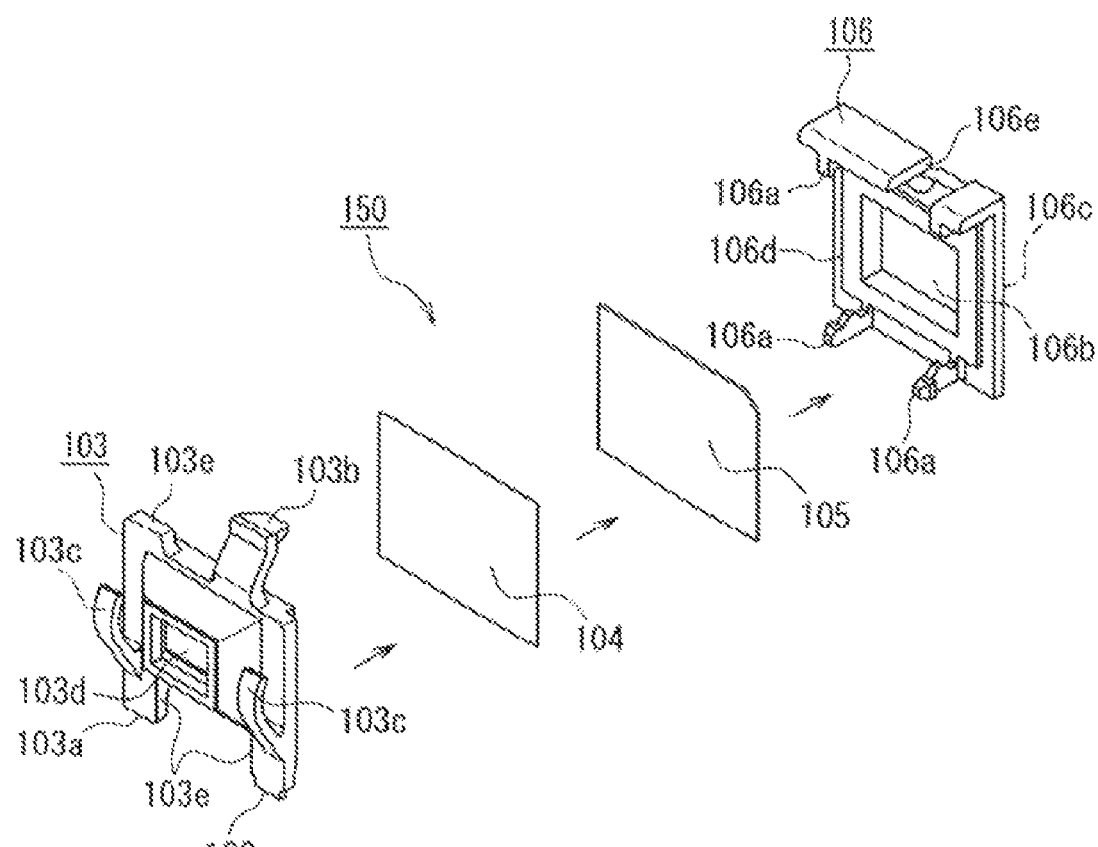
FIG. 2D is an exploded perspective view of a BL unit in Embodiment 1.
Figure 3:
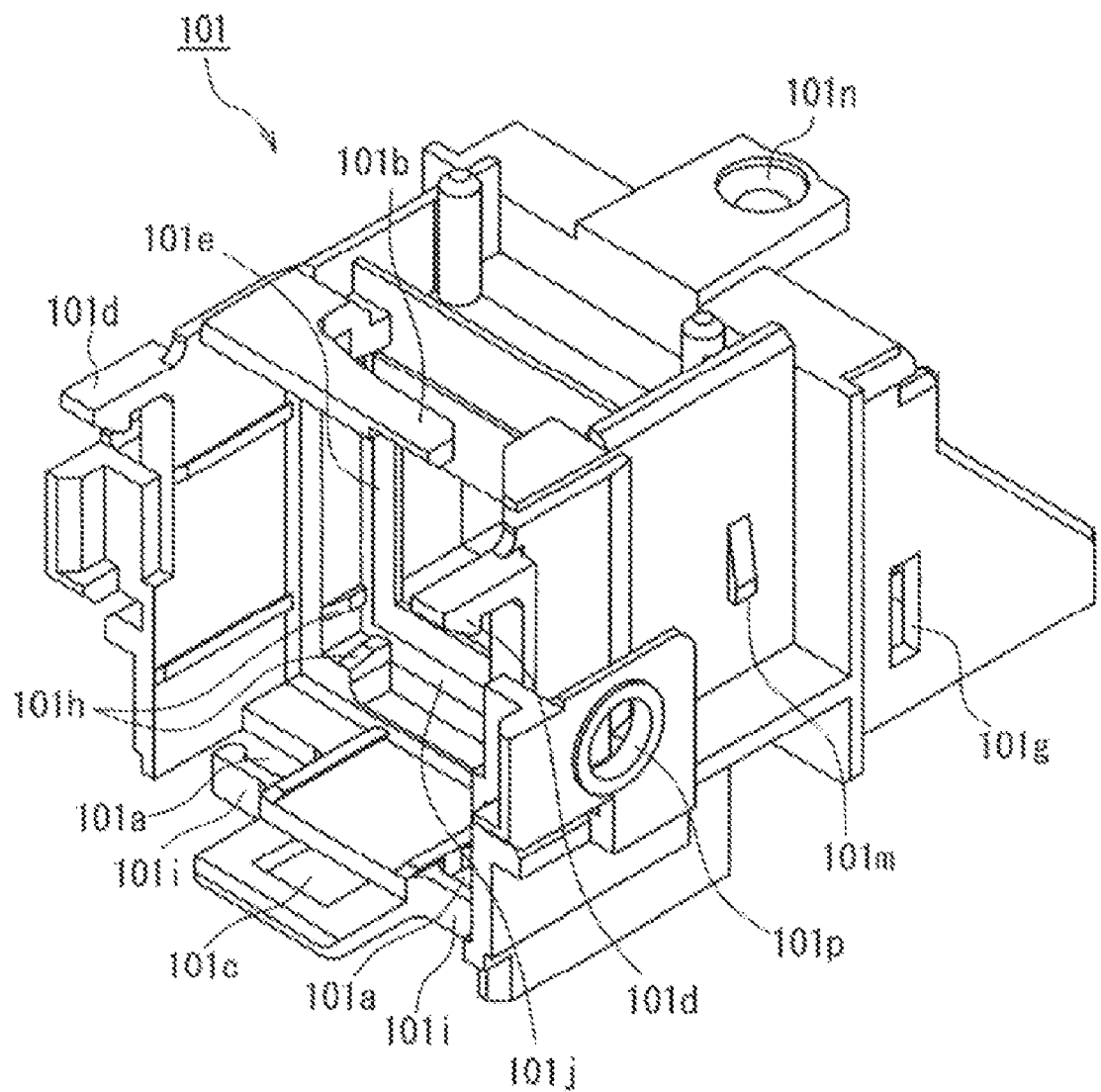
FIG. 3 is a perspective view of an LCD holding piece in Embodiment 1.
Figure 4:
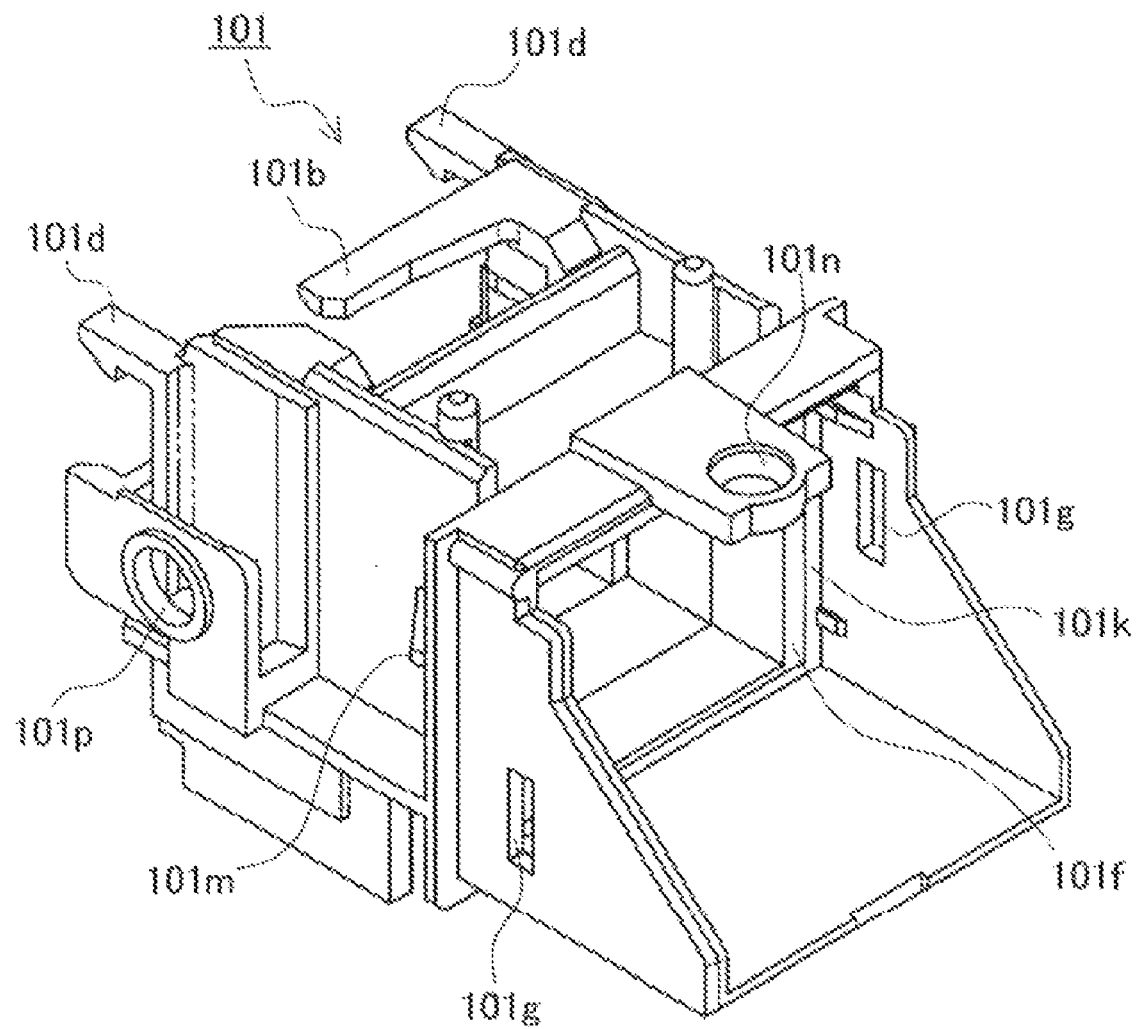
FIG. 4 is a perspective view of the LCD holding piece in Embodiment 1.

FIG. 1 is a perspective view showing an outer appearance of an image pickup apparatus with an image display device in Embodiment 1 mounted thereon. FIG. 2A is an exploded perspective view of the image display device in Embodiment 1. FIG. 2B is an exploded perspective view of a slide case 112 shown in FIG. 2A. FIG. 2C is an exploded perspective view of an LCD (liquid crystal display) unit 140 shown in FIG. 2A. FIG. 2D is an exploded perspective view of a BL (backlight) unit 150 shown in FIG. 2C. FIGS. 3 and 4 are perspective views of an LCD holding piece 101.

As shown in FIG. 1, the image display device in Embodiment 1 is mounted on an image pickup apparatus such as a video camera 20, for example. The video camera 20 includes at least a lens portion 21, an EVF (electric viewfinder) 22, and a liquid crystal monitor 23. The lens portion 21 contains an optical lens and an image pickup element, and converts light incident through the optical lens from outside into an electric image signal with an image pickup element. The EVF 22 contains a display portion capable of displaying the electric image signal or the like obtained from the lens portion 21. A user can identify visually an image and the like that are being captured by peeping through the EVF 22. The liquid crystal monitor 23 is placed rotatably on a housing of the image pickup apparatus 20, and can display an electric image signal and the like, which are obtained by subjecting a light image condensed by the lens portion 21 to photoelectric conversion, on the display portion 24. It is not necessarily required to provide both the EVF 22 and the liquid crystal monitor 23, and either one of them may be provided.

Hereinafter, as an example of the image display device, the configuration of the EVF 22 will be described.

As shown in FIG. 2A, the image display device includes an EVF unit that is a main portion in the present embodiment, and a main body FPC (flexible print circuit) unit 127 to be coupled to the EVF unit. The main body FPC unit 127 connects the EVF unit to other circuits such as a display control circuit. The EVF unit basically includes a visibility adjustment unit 111, a slide frame 123, an EVF reinforcement piece 126, a main body slide case holder 129 and an LCD unit 140.

As shown in FIG. 2B, the visibility adjustment unit 111 includes a slide case 112, a lens holder 113, an optical lens 114, a visibility adjustment knob 115, and a slide case sheet 120.

As shown in FIG. 2C, the LCD unit 140 basically includes an LCD holding piece 101, an LCD panel 102, an EVF substrate 107, a polarizing plate 108, a polarizing plate pressure member 109, an EVF click spring 110, and a BL unit 150.

As shown in FIG. 2D, the BL unit 150 (lid) basically includes a BL piece 103 (light source side lid), a diffusion sheet 104, a BL polarizing plate 105, and an LCD pressure piece 106 (display device side lid). Hereinafter, the detailed configuration of each member will be described.

As shown in FIGS. 3 and 4, the LCD holding piece 101 (holding member) includes holes 101a, an elastic support portion 101b, an insertion hole 101c, engagement hooks 101d, an LCD receiving plane 101e, a polarizing plate receiving plane 101f, holes 101g, positioning ribs 101h, holding piece elastic arms 101i, an LCD concave portion 101j, a polarizing plate concave portion 101k, hooks 101m, a concave portion 101n, holes 101p, and a hook 101r. Furthermore, the LCD holding piece 101 is formed in a substantially angularly cylindrical shape, and a through-hole capable of transmitting light is formed therein. The user can identify visually an image displayed on the LCD panel 102 through the through-hole from an eyecap 130 side. Furthermore, the LCD holding piece 101 is formed by subjecting a resin having excellent slidability such as a polyacetal resin to injection molding. Furthermore, in an optical axis direction of the LCD holding piece 101, an end of the LCD holding piece 101 on a side where the concave portion 101n and the like are placed is defined as a "first end", and an end the LCD holding piece 101 on a side where the holes 101a, the elastic support portion 101b, and the like are placed is defined as a "second end". FIG. 3 is a perspective view seen from the second end side, and FIG. 4 is a perspective view seen from the first end side.

The holes 101a are formed on a lower side of the second end side in the LCD holding piece 101 so as to open in a direction substantially perpendicular to an optical axis, and the second end side is surrounded by the holding piece elastic arms 101i. Furthermore, although two holes 101a are formed in the present embodiment, the number thereof is not limited thereto. Furthermore, each hole 101a has a size such that an insertion leg 103a formed at the BL piece 103 can be inserted.

The elastic support portion 101b (biasing portion) is formed on an upper side of the second end side in the LCD holding piece 101 so as to protrude from a side wall of the LCD holding piece 101 substantially horizontally. Furthermore, the elastic support portion 101b is formed so as to come into contact with a fixing hook 103b formed at the BL piece 103 when the BL unit 150 is held by the LCD holding piece 101.

The insertion hole 101c is formed substantially at the center of a lower end of the second end side in the LCD holding piece 101 so as to open in a direction substantially perpendicular to the optical axis. Furthermore, the insertion hole 101c has a size such that a protrusion 107c formed at the EVF substrate 107 can be inserted. It is preferred that the insertion hole 101c is formed in a size having a clearance with respect to the protrusion 107c while the protrusion 107c is inserted in the insertion hole 101c.

The engagement hooks 101d are formed at an upper end of the second end side in the LCD holding piece 101 so that the hook shape protrudes downward. Furthermore, the engagement hooks 101d are formed one at each of the right and left ends. Furthermore, the engagement hooks 101d are formed so as to be engaged with portions to be engaged 107d formed at the EVF substrate 107, when the EVF substrate 107 is engaged with the LCD holding piece 101. Furthermore, the engagement hooks 101d are formed so as to be deformed elastically when they are engaged with the portions to be engaged 107d.

The LCD receiving plane 101e (first contact plane) extends toward the optical axis in an inner plane of the LCD holding piece 101, and can come into contact with an outer peripheral edge of a display surface of the LCD panel 102. Furthermore, the LCD receiving plane 101e is formed on the periphery of a substantially rectangular opening with the optical axis being the center so as not to cover an effective display region on the display surface of the LCD panel 102. An area defined by the outer periphery of the LCD receiving plane 101e is equal to or smaller than an area defined by the outer periphery of the LCD panel 102. Thus, an edge of the LCD panel 102 is formed so as not to come into contact with the LCD receiving plane 101e.

The polarizing plate receiving plane 101f is formed so as to allow the polarizing plate 108 inserted from the first end side to come into contact therewith and so as to position the polarizing plate 108 in the optical axis direction in the inner plane of the LCD holding piece 101. Furthermore, the polarizing plate receiving plane 101f comes into contact with the polarizing plate 108 in a range smaller than an outer peripheral edge of the polarizing plate 108 placed on an optical path of a light beam, and is formed so that the edge of the polarizing plate 108 does not come into contact with the polarizing plate receiving plane 101f.

The holes 101g are formed on right and left side walls of the LCD holding piece 101, and pressure hooks 109a formed at the polarizing plate pressure member 109 are engaged with the holes 101g.

The positioning ribs 101h are formed so as to protrude to the inner plane of the LCD holding piece 101, and can position the LCD panel 102 when the LCD panel 102 is placed in contact with the LCD receiving plane 101e.

The holding piece elastic arms 101i (biasing portions) are formed on a lower side of the second end side in the LCD holding piece 101, and formed so as to be deformed elastically in the optical axis direction. Furthermore, when the insertion legs 103a are inserted in the holes 101a, the holding piece elastic arms 101i are pressed against the insertion legs 103a to be deformed elastically, and can provide a biasing force to the insertion legs 103a. The biasing portion is composed of the elastic support portion 101b and the holding piece elastic arm 101i.

The LCD concave portion 101j corresponds to a region that is formed on the periphery of the LCD receiving plane 101e and does not come into contact with the outer peripheral edge of the LCD panel 102. Thus, the edge of the LCD panel 102 can be prevented from rubbing against the LCD receiving plane 101e, thereby preventing the generation of foreign matter such as debris. In the case where the LCD concave portion 101j is not formed, the LCD panel 102 is pressed strongly against the LCD receiving plane 101e, and the LCD panel 102 sinks to the LCD receiving plane 101e slightly to be engaged with the edge, with result that foreign matter may be generated due to shaving. In contrast by forming the LCD concave portion 101j as in the present embodiment, even the slight possibility of the generation of foreign matter due to shaving can be avoided.

The polarizing plate concave portion 101k corresponds to a region that is formed on the periphery of the polarizing plate receiving plane 101f, and does not come into contact with the outer peripheral edge of the polarizing plate 108. Since the polarizing plate concave portion 101k is formed, even in the case where foreign matter adheres to or is mixed in the periphery of the polarizing plate 108 to be mixed in a place other than an image display range, the difference in level between the polarizing plate receiving plane 101f and the polarizing plate concave portion 101k becomes an obstacle, which can prevent the foreign matter from moving to the image display range side with respect to the polarizing plate concave portion 101k.

The hooks 101m are formed so as to protrude from both side walls of the LCD holding piece 101. The hooks 101m are engaged with engagement holes 110a formed in the EVF click spring 110 when the EVF click spring 110 and the LCD holding piece 101 are coupled to each other.

The concave portion 101n is formed in an upper portion of the first end side in the LCD holding piece 101. The concave portion 101n has an inner diameter larger than a screw diameter of a screw 122 (see FIG. 2A).

The holes 101p are formed so as to pass through both side walls of the LCD holding piece 101. Each hole 101p has an inner diameter in which at least a screw portion of a screw 124 (see FIG. 2A) can be inserted.

The hook 101r is formed so as to protrude from a bottom surface of the LCD holding piece 101. The hook 101r is engaged with a hole 112a formed in the slide case 112 when the LCD holding piece 101 is coupled to the slide case 112.

As shown in FIG. 2C, the LCD panel 102 (image display device) is configured by attaching two glasses to each other and sealing a liquid crystal material therebetween. Although the outer peripheral edge of the LCD panel 102 is protected partially with a sealing agent, it forms a sharp end face in a large range. Furthermore, the LCD panel 102 includes an FPC 102a connected electrically to a display control circuit provided separately in the device. The LCD panel 102 can display an image and the like on a display area 102b with a control signal input through the FPC 102a. For example, in the case where the device corresponds to the EVF mounted on a video camera, an image and the like captured with an image pickup element can be displayed.

As shown in FIG. 2D, an opening 103d for inserting a light-emitting diode 107e (see FIGS. 5 and 6) is formed at the center of the BL piece 103. Furthermore, in the BL piece 103, the periphery of the opening 103d is formed of a concave curved plane. Furthermore, the BL piece 103 is formed of a white synthetic resin material. Furthermore, the BL piece 103 includes the insertion legs 103a, the fixing hook 103b, elastic arms 103c, the opening 103d, and portions to be held 103e. Furthermore, the BL piece 103 is coupled to the LCD pressure piece 106 with the diffusion sheet 104 and the BL polarizing plate 105 interposed therebetween.

The insertion legs 103a are formed so as to protrude from a lower end of the BL piece 103 and inserted in the holes 101a. In the present embodiment two insertion legs 103a are formed.

The fixing hook 103b is formed so as to protrude from an upper end of the BL piece 103, and is coupled to the elastic support portion 101b when the BL unit 150 is coupled to the LCD holding piece 101.

The elastic arms 103c protrude so as to be opposed to the EVF substrate 107 on both sides of the opening 103d. Furthermore, the elastic arms 103c can be deformed elastically in the optical axis direction. Thus, when the EVF substrate 107 is coupled to the LCD holding piece 101, the elastic arms 103c come into contact with a back surface of the EVF substrate 107 while being deformed elastically thereby suppressing looseness of the EVF substrate 107.

The opening 103d is formed substantially at the center of the BL piece 103, and is formed for the purpose of guiding light emitted from the light-emitting diode 107e to the LCD panel 102 side.

The portions to be held 103e are fitted in three fitting portions 106a formed at the LCD pressure piece 106. The portions to be held 103e respectively are formed on an upper side and a lower side of an end opposed to each other on a plane perpendicular to the optical axis in the BL piece 103. The portion to be held 103e on the upper side is fitted in the fitting portion 106a on the upper side. The portions to be held 103e on the lower side correspond to inner surface portions of two insertion legs 103a, and are fitted in the fitting portions 106a on the lower side.

The diffusion sheet 104 (optical member) is placed on an optical path of a light beam, and can diffuse light emitted by the light-emitting diode 107e in a plane direction. The diffusion sheet 104 is placed between the BL piece 103 and the BL polarizing plate 105.

The BL polarizing plate 105 (optical member) is a plate-shaped optical member that is placed on an optical path of a light beam and is formed of a polarizing material polarizing the light beam. The BL polarizing plate 105 is placed between the diffusion sheet 104 and the LCD pressure piece 106.

The LCD pressure piece 106 can hold the diffusion sheet 104 and the BL polarizing plate 105 so that they are interposed between the LCD pressure piece 106 and the BL piece 103. The LCD pressure piece 106 includes the fitting portions 106a, an opening 106b, a LCD contact plane 106c, a polarizing plate contact plane 106d, and an opening 106e.

The fitting portions 106a allow the portions to be held 103e of the BL piece 103 to be fitted therein. One fitting portion 106a is formed on an upper side of the LCD pressure piece 106 and two fitting portions 106a are formed on a lower side thereof. Furthermore, the fitting portions 106a can hold the diffusion sheet 104 and the BL polarizing plate 105.

The opening 106b is formed substantially at the center of a principal plane of the LCD pressure piece 106 so as not to block an optical path of a light beam output from the light-emitting diode 107e.

Figure 5:
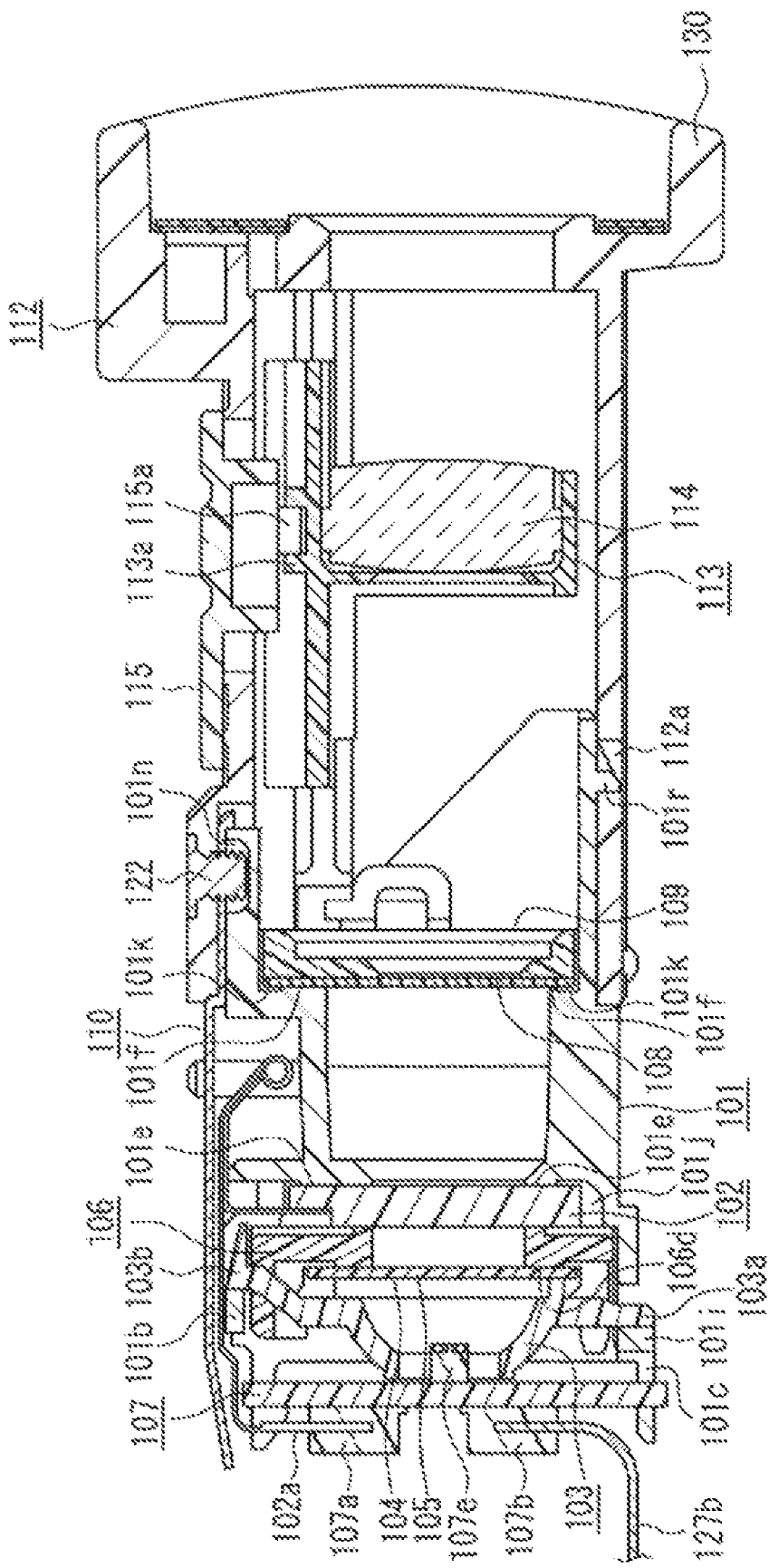
FIG. 5 is a cross-sectional view of the image display device in Embodiment 1.

The LCD contact plane 106c (second contact plane) is formed on one surface (surface opposed to the LCD panel 102) of the LCD pressure piece 106, and as shown in FIG. 5, corresponds to a plane formed so as to protrude in the optical axis direction on the periphery of the opening 106b. Thus, one entire surface of the LCD pressure piece 106 does not come into contact with the LCD panel 102, but the LCD contact plane 106c that is a part of the LCD pressure piece 106 comes into contact with the LCD panel 102. An area defined by the outer periphery of the LCD contact plane 106c is equal to or smaller than an area defined by the outer periphery of the LCD panel 102, so that an edge of the LCD panel 102 does not come into contact with the LCD contact plane 106c.

The polarizing plate contact plane 106d (third contact plane) corresponds to a plane that is formed on the other surface (surface opposed to the polarizing plate 105 and back surface of the LCD contact plane 106c) of the LCD pressure piece 106, and that is formed so as to extend in the optical axis direction on the periphery of the opening 106b, as shown in FIG. 5. Thus, the other entire surface of the LCD pressure piece 106 does not come into contact with the polarizing plate 105, but the polarizing plate contact plane 106d that is a part of the LCD pressure piece 106 comes into contact with the polarizing plate 105. An area defined by the outer periphery of the polarizing plate contact plane 106d is equal to or smaller than an area defined by the outer periphery of the polarizing plate 105, so that an edge of the polarizing plate 105 does not come into contact with the polarizing plate contact plane 106d.

The opening 106e is formed in an upper portion of the LCD pressure piece 106. The opening 106e allows the fixing hook 103b to be placed therein when the LCD pressure piece 106 and the BL piece 103 are coupled to each other.

As shown in FIG. 2C, the EVF substrate 107 electrically connects another circuit board in the device to the FPC 102a connected to the LCD panel 102. The EVF substrate 107 includes an LCD connector 107a, a connector 107b, a protrusion 107c, portions to be engaged 107d, and a light-emitting diode 107e. The LCD connector 107a is connected to the FPC 102a. The connector 107b is connected to an FPC 127b of the main body FPC unit 127. The protrusion 107c is fitted in the insertion hole 101c when the EVF substrate 107 is coupled to the LCD holding piece 101. The portions to be engaged 107d are portions with which the engagement hooks 101d are engaged. The light-emitting diode 107e is an element that emits light when supplied with power via the FPC 127b, and is a light source for illuminating one surface of the LCD panel 102.

The polarizing plate 108 is a plate-shaped optical member formed of a polarizing material that polarizes a light beam. The polarizing plate 108 is held between the polarizing plate receiving plane 101f and the polarizing plate pressure member 109.

The polarizing plate pressure member 109 is a component that allows the LCD holding piece 101 to hold the polarizing plate 108. The hooks 109a are formed on both side faces of the polarizing plate pressure member 109, and an opening 109b is formed on a principal plane of the polarizing plate pressure member 109. The hooks 109a can be engaged with the holes 101g when the polarizing plate pressure member 109 is coupled to the LCD holding piece 101. The opening 109b is formed so as to allow an image displayed on the display area 102b of the LCD panel 102 to be identified visually.

The EVF click spring 110 is formed of an elastically deformable material such as a sheet metal. Furthermore, the EVF click spring 110 is provided with engagement holes 110a, biasing portions 110b, a hole 110c, and holes 110d. The EVF click spring 110 is coupled to the LCD holding piece 101 so as to cover it from above. When the EVF click spring 110 is coupled to the LCD holding piece 110, the hooks 101m are engaged with the engagement holes 110a. Furthermore, the biasing portions 110b are formed in a substantially band shape so as to be deformed elastically, and a tip end of each biasing portion is provided with, for example, a substantially semispherical protrusion. The biasing portions 110b generate a load by sliding over an inner surface of the slide frame 123 when the EVF is subjected to a slide operation. The hole 110c is formed on an upper surface of the EVF click spring 11 and accepts the screw 122 (see FIG. 2A). The holes 110d are formed on both side walls of the EVF click spring 110, and respectively allow a screw 128 to be screwed therein.

As shown in FIG. 2B, the visibility adjustment unit 111 can adjust an image displayed on the LCD unit 102 to a visibility at which a user can see easily.

The slide case 112 is formed in a substantially angularly cylindrical shape, and the eyecap 130 is informed integrally at an end in a longitudinal direction. Furthermore, the hole 112a capable of being engaged with the hook 101r formed on the bottom surface of the LCD holding piece 101 is formed on a bottom surface of the slide case 112. Furthermore, a hole 112b to which the visibility adjustment knob 115 is coupled rotatable is formed on an upper surface of the slide case 112. Furthermore, a hole 112c in which the screw 122 is screwed is formed on the upper surface of the slide case 112. Furthermore, the slide case 112 is provided with an opening 112d in which the lens holder 113 and the optical lens 114 can be accommodated. The opening 112d is formed so as to extend through the slide case 112 in the longitudinal direction.

The lens holder 113 is formed in a substantially T-shape when viewed from a side face, and is provided with a cam groove 113a and a guide groove 113b on an upper surface. Furthermore, the lens holder 113 is provided with a lens holding portion 113c capable of holding the optical lens 114. The guide groove 113b is formed substantially in parallel to the optical axis of the optical lens 114. The cam groove 113a can convert the rotation movement of the visibility adjustment knob 115 into linear movement. More specifically, a pin 115a formed at the visibility adjustment knob 115 is fitted in the cam groove 113a, and the pin 116a is moved in the cam groove 113a by rotating the visibility adjustment knob 115, whereby the lens holder 113 can be moved in the optical axis direction.

The optical lens 114 is held by the lens holder 113. The optical lens 114 is moved in the optical axis direction together with the lens holder 113 when the user rotates the visibility adjustment knob 115, whereby the optical lens 114 can be adjusted to an arbitrary visibility.

The visibility adjustment knob 115 is composed of a rotation operating portion in a substantially disk shape, and is fitted in the hole 112b rotatably. The pin 115a is formed on a back surface of the visibility adjustment knob 115. Furthermore, the surface (operation plane) of the visibility adjustment knob 115 may be provided with a protrusion so as to be hooked easily by the finger of the user.

As shown in FIG. 2A, the screw 122 is inserted through the hole 112c formed in the slide case 112, and screwed in the hole 110c formed in the EVF click spring 110. The screw 122 is inserted through the hole 110c while being screwed in the hole 110c, and a tip end thereof is positioned in the concave portion 101n as shown in FIG. 5. A screw diameter of the screw 122 is smaller than at least an inner diameter of the concave portion 101n, so that there is a clearance between the EVF click spring 110 and the slide case 112, and the LCD holding piece 101.

The slide frame 123 slidably holds the slide case 112 and the LCD unit 140 that are integrated. In the present embodiment, the slide frame 123 is composed of metal such as a sheet plate. Furthermore, the slide frame 123 is formed of frame fitting holes 123a, slide holes 123b, and a hole 123c. The frame fitting holes 123a are formed on both side walls of the slide frame 123 so as to extend therethrough, and allow pins 129a formed at the slider case holder 129 to be fitted therein. The slide holes 123b are formed on both side walls of the slide frame 123 so as to extend therethrough, and allow screws 124 to be inserted therethrough slidably. The hole 123c allows the screw 128 to be screwed therein.

The screws 124 can couple the LCD unit 140 to the slide frame 123 slidably. The screws 124 are screwed in the holes 110d via slide washers 125, the slide holes 123b, and the holes 101p. The screws 124 are formed of stepped screws in the present embodiment.

The slide washer 125 is placed between the slide frame 123 and a head of the screw 124. By providing the slide washer 125, the slide operation of the screw 124 with respect to the slide frame 123 can be smoothened, and the slide operation of the EVF can be smoothened.

The EVF reinforcement piece 126 is fixed at one end of the slide frame 123 in the longitudinal direction. The EVF reinforcement piece 126 is fixed to the slide frame 123, whereby the slide frame 123 can be reinforced and the main body FPC unit 127 can be held.

An EVF detection SW (not shown) for detecting the slide position of the EVF is mounted on the main body FPC unit 127. Furthermore, the main body FPC unit 127 is provided with a screw hole 127a, and allows the screw 128 to be inserted therein when the main body FPC unit 127 is coupled to the slide frame 123. The main body FPC unit 127 is provided with the FPC 127b that is connected electrically to an external circuit.

The slide case holder 129 is fixed to the other end of the slide frame 123 in the longitudinal direction. The slide case holder 129 is fixed to the slide frame 123, whereby the LCD unit 140 and the slide case 112 are prevented from coming off from the slide frame 123.

The eyecap 130 is formed integrally at an end of the slide case 112 so as to protect the eye of the user when the user peeps through the EVF. The eyecap 130 may be formed integrally with the slide case 112, or may be molded separately from the slide case 112 to be fixed to the slide case 112.

[2. Method of Assembling an Image Display Device]

[2-1. Method of Assembling a Visibility Adjustment Unit 111]

As shown in FIG. 2B, the optical lens 114 is fitted in the lens holding portion 113c formed at the lens holder 113. In order to fix the optical lens 114 to the lens holder 113, protrusions formed on side faces of the optical lens 114 are fitted in concave portions formed in the lens holding portion 113.

Next, the lens holder 113 with the optical lens 114 fixed thereto is mounted in the opening 112d of the slide case 112. At this time, the lens holder 113 is mounted in the opening 112d so that the guide groove 113b is fitted slidably in a guide rail (not shown) formed on an upper surface of an inner wall of the slide case 112. Consequently, the lens holder 113 can be mounted slidably in the opening 112d in a lens optical axis direction.

Next, the visibility adjustment knob 115 is mounted on an upper surface of the slide case 112. Specifically, the visibility knob 115 for adjusting the position of the optical lens 114 in accordance with the eyesight of the user is inserted in the hole 112b formed in the slide case 112 and held rotatably. At this time, the pin 115a formed on the back surface of the visibility adjustment knob 115 is fitted in the cam groove 113a formed on the lens holder 113. This can convert the rotation movement of the visibility adjustment knob 115 into linear movement of the lens holder 113. The eyecap 130 with which the eye of the user comes into contact is formed integrally with the slide case 112.

Next, the slide case sheet 120 is attached to an inner surface of the eyecap 130 with a double-faced tape (not shown).

Thus, the visibility adjustment unit 111 is completed.

[2-2. Method of Assembling an LCD Unit 140]

As shown in FIG. 2C, first, the LCD panel 102 is inserted in the LCD holding piece 101. More specifically, the LCD panel 102 is inserted from the second end side of the LCD holding piece 101 and brought into contact with the LCD receiving plane 101e (see FIG. 3). At this time, the LCD panel 102 is inserted in such a direction that the FPC 102a is pulled upward. Furthermore, the LCD receiving plane 101e is formed so that an area defined by an outer periphery thereof is equal to or smaller than an area defined by an outer periphery of the LCD panel 102. Therefore, while the LCD panel 102 is in contact with the LCD receiving plane 101e, an edge of the LCD panel 102 is not in contact with the LCD receiving plane 101e and other components (see FIG. 5).

Next, the BL unit 150 is mounted on the LCD holding piece 101. Specifically, while the BL piece 103 and the LCD pressure piece 106 are coupled to each other, the insertion legs 103a (see FIG. 2D) formed at the BL piece 103 are inserted in the holes 101a (see FIG. 3) of the LCD holding piece 101 from above. At this time, the insertion legs 103a are inserted in the holes 101a with a clearance. Next, the fixing hook 103b (see FIG. 2D) is engaged with the elastic support portion 101b (see FIG. 3). Consequently, the holding piece elastic arms 101i and the elastic support portion 101b respectively bias the insertion legs 103a and the fixing hook 103b elastically, whereby the LCD panel 102 is biased to be held on the LCD receiving plane 101e via the light-emitting unit. The elastic support portion 101b is elastically deformable. Therefore, during engagement, the elastic support portion 101b is pushed upward by the fixing hook 103b, and at a time of the completion of the engagement, the elastic support portion 101b is restored to an original shape. Furthermore, while the BL unit 150 is mounted on the LCD holding piece 101, the LCD contact plane 106c formed on the LCD pressure piece 106 comes into contact with a plane other than an effective display region of the LCD panel 102 (see FIG. 5), so that light output from the LCD panel 102 is not blocked. Furthermore, the LCD contact plane 106c is formed so that an area defined by an outer periphery thereof is equal to or smaller than an area defined by an outer periphery of the LCD panel 102, so that an edge of the LCD panel 102 is not in contact with the LCD contact plane 106c and other components (see FIG. 5). A method of assembling the BL unit 150 will be described later.

Next, the EVF substrate 107 is mounted on the LCD holding piece 101. Specifically, the protrusion 107c formed at the EVF substrate 107 is inserted in the insertion hole 101c formed in the LCD holding piece 101. Next, the EVF substrate 107 is mounted on the LCD holding piece 101 so that a first plane (plane on which the light-emitting diode 107e is placed) is opposed to the BL unit 150. During mounting, the engagement hooks 101d (see FIG. 3) formed at the LCD holding piece 101 are engaged with the portions to be engaged 107d, whereby the EVF substrate 107 can be mounted on the LCD holding piece 101. Consequently, as shown in FIG. 5, the light-emitting diode 107e is inserted through the opening 103d to be placed so as to be opposed to the effective display region of the LCD panel 102. The elastic arms 103c that come into contact with the EVF substrate 107 elastically are formed integrally with the BL piece 103. When the EVF substrate 107 is fitted in the LCD holding piece 101, the elastic arms 103c bias the EVF substrate 107 elastically.

Next, the FPC 102a of the LCD panel 102 is inserted in the LCD connector 107a mounted on the EVF substrate 107 and connected electrically thereto. The LCD panel 102, the BL unit 150, and the EVF substrate 107 may be mounted on the LCD holding piece 101 after the FPC 102a is connected to the LCD connector 107a.

Next, the polarizing plate 108 is mounted on the LCD holding piece 101. Specifically, the polarizing plate 108 is inserted in the opening from the first end side of the LCD holding piece 101, and is brought into contact with the polarizing plate receiving plane 101f (see FIG. 4). At this time, a plane of the polarizing plate 108 other than an effective optical path thereof is in contact with the polarizing plate receiving plane 101f. Furthermore, the polarizing plate receiving plane 101f is formed so that an area defined by an outer periphery thereof is equal to or smaller than an area defined by an outer periphery of the polarizing plate 108, so that an edge of the polarizing plate 108 is not in contact with the polarizing plate receiving plane 101f and other components. Furthermore, the polarizing plate 108 is not in contact with the polarizing plate concave portion 101k (see FIG. 5).

Next, the polarizing plate pressure member 109 is mounted on the LCD holding piece 101. The polarizing plate pressure member 109 is provided with the pressure hooks 109a, and the LCD holding piece 101 is provided with the holes 101g. When the pressure hooks 109a are engaged with the holes 101g, the polarizing plate 108 is held between the polarizing plate pressure member 109 and the LCD holding piece 101.

Next, the EVF click spring 110 is mounted on the LCD holding piece 101. More specifically, the hooks 101m formed on both side walls of the LCD holding piece 101 are engaged with the engagement holes 110a formed on both side walls of the EVF click spring 110. Consequently, the EVF click spring 110 can give a predetermined load to the slide operation of the EVF, and cover the upper portion of the LCD panel 102. While the EVF click spring 110 is mounted on the LCD holding piece 101, the hole 110c is positioned in the upper portion of the concave portion 101n, and the holes 110d are positioned on an inner side of the holes 101p.

Thus, the LCD unit 140 is completed.

In the present embodiment, the LCD unit 102, the BL unit 150, and the EVF substrate 107 are combined with each other, and the polarizing plate 108 and the polarizing plate pressure member 109 are combined therewith, and the EVF click spring 110 is incorporated. However, the assembly order is not limited thereto. The assembly operability is not degraded at least when the EVF click spring 110 is incorporated after the LCD unit 102 is combined.

[2-3. Method of Assembling a BL Unit 150]

As shown in FIG. 2D, first, the diffusion sheet 104 and the BL polarizing plate 105 are brought into contact with the polarizing plate contact plane 106d of the LCD pressure piece 106. Specifically, the diffusion sheet 104 and the BL polarizing plate 105 are fitted in the fitting portions 106a, and held at three points in upper and lower portions. At this time, the diffusion sheet 104 and the BL polarizing plate 105 are placed so that they are positioned on an optical path of a light beam output from the light-emitting diode 107e.

Next, the BL piece 103 and the LCD pressure piece 106 are coupled to each other so that the diffusion sheet 104 and the BL polarizing plate 105 are interposed therebetween. Specifically, the portions to be held 103e of the BL piece 103 are fitted in the fitting portions 106a, whereby the BL piece 103 is held at three points in upper and lower portions. At this time, the fixing hook 103b is positioned in the opening 106e.

Thus, the BL unit 150 is completed.

[2-4. Method of Assembling an EVF Unit]

As shown in FIG. 2A, first, the visibility adjustment unit 111 is inserted in the slide case holder 129. The slide case holder 129 is configured so as to allow the slide case 112 to be inserted therein slidably and so as not to allow the eyecap 103 to be inserted therein.

Next, the LCD unit 140 is inserted in the visibility adjustment unit 111. By inserting the LCD unit 140 in the visibility adjustment unit 111, the hole 112a formed in the slide case 112 and the hook 101r formed at the LCD holding piece 101 fit together and are fixed provisionally. In this state, the hole 112c and the hole 110c are positioned so as to overlap each other on a projected plane.

Next, the visibility adjustment unit 111 and the LCD unit 140 are coupled to each other with the screw 122. Specifically, the screw 122 is inserted in the hole 112c to be screwed in the hole 110c. Thus, the visibility adjustment unit 111 and the LCD unit 140 can be coupled to each other. A tip end of the screw 122 screwed in the hole 110c passes though the hole 110c, and is positioned in the concave portion 101n (see FIG. 3). The inner diameter of the concave portion 101n is designed to be larger than the screw diameter of the screw 122. Therefore, the tip end of the screw 122 is positioned in the concave portion 101n with a clearance without being engaged with the LCD holding piece 101. The tip end of the screw 122 is positioned in the concave portion 101n, whereby chips when the inner wall of the hole 110c is shaved during screwing can be prevented from falling or adhering to the surface of the polarizing plate 108.

Next, the slide case holder 129 and the slide frame 123 are coupled to each other. Specifically, the pins 129a formed at the slide case holder 129 are fitted in the frame fitting holes 123a (see FIG. 2C) formed in the slide frame 123, whereby the slide case holder 129 and the slide frame 123 can be coupled to each other.

Next, the slide frame 123 and the LCD unit 140 are coupled to each other. Specifically, the screws 124 inserted in the slide washers 125 are screwed in the holes 110d (see FIG. 2C) formed in the EVF click spring 110 through the slide holes 123b formed in the slide frame 123 and the holes 101p (see FIG. 3). Thus, the LCD unit 140 can be coupled to the slide frame 123 slidably. At this time, the biasing portion 110b comes into contact with an inner surface of the slide frame 123 while being deformed elastically.

Next, the EVF reinforcement piece 126 and the slide frame 123 are coupled to each other. This can reinforce the slide frame 123 and hold the main body FPC unit 127.

Next, the main body FPC unit 127 and the slide frame 123 are coupled to each other. Specifically, the screw 128 is inserted in the screw hole 127a formed in the main body FPC unit 127, and is screwed in the hole 123c formed in the slide frame 123. Next, the FPC 127b is inserted in the connector 107b to be connected thereto electrically.

Thus, the EVF unit is completed.

Figure 6:
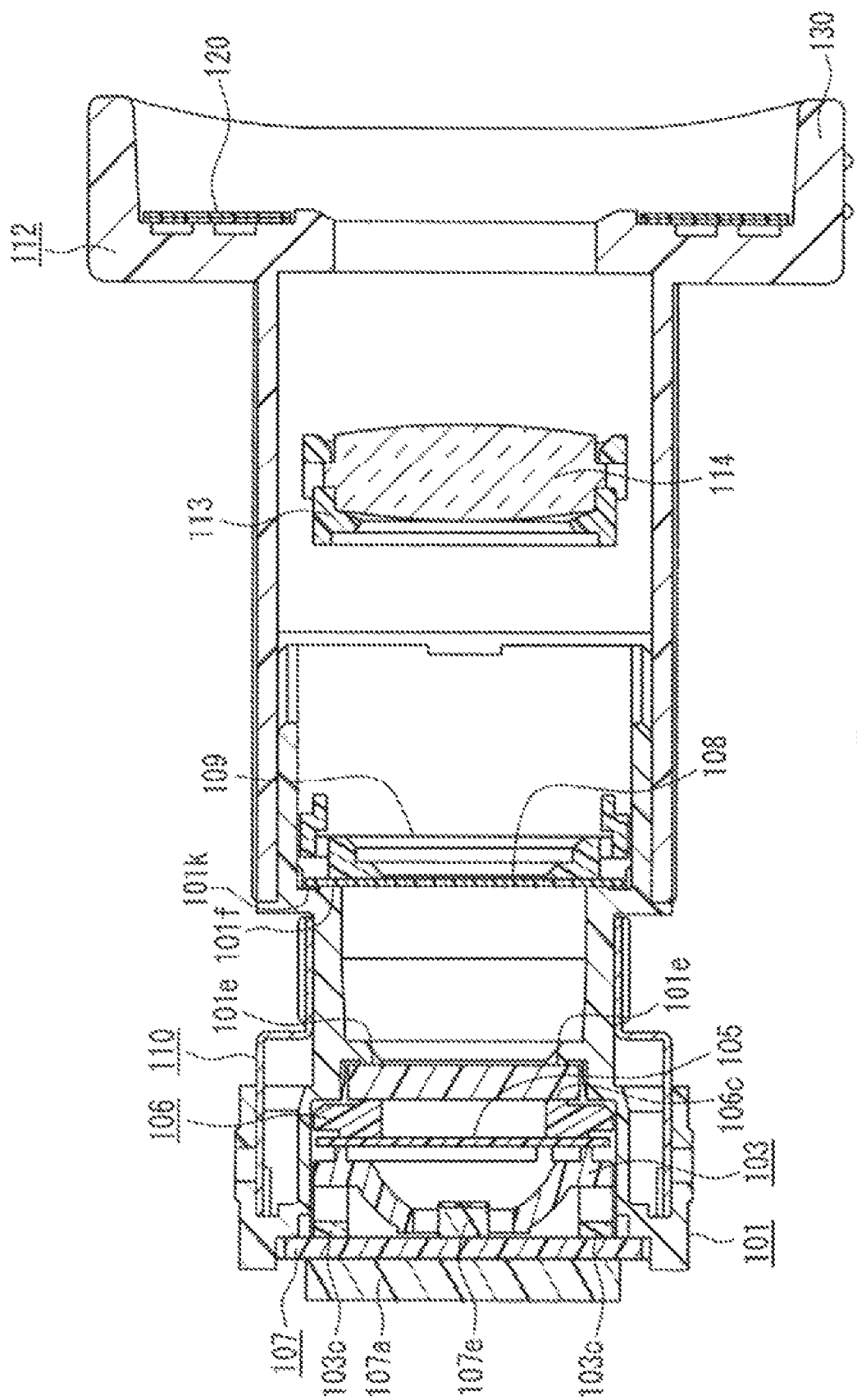
FIG. 6 is a cross-sectional view of the image display device in Embodiment 1.
Figure 7:
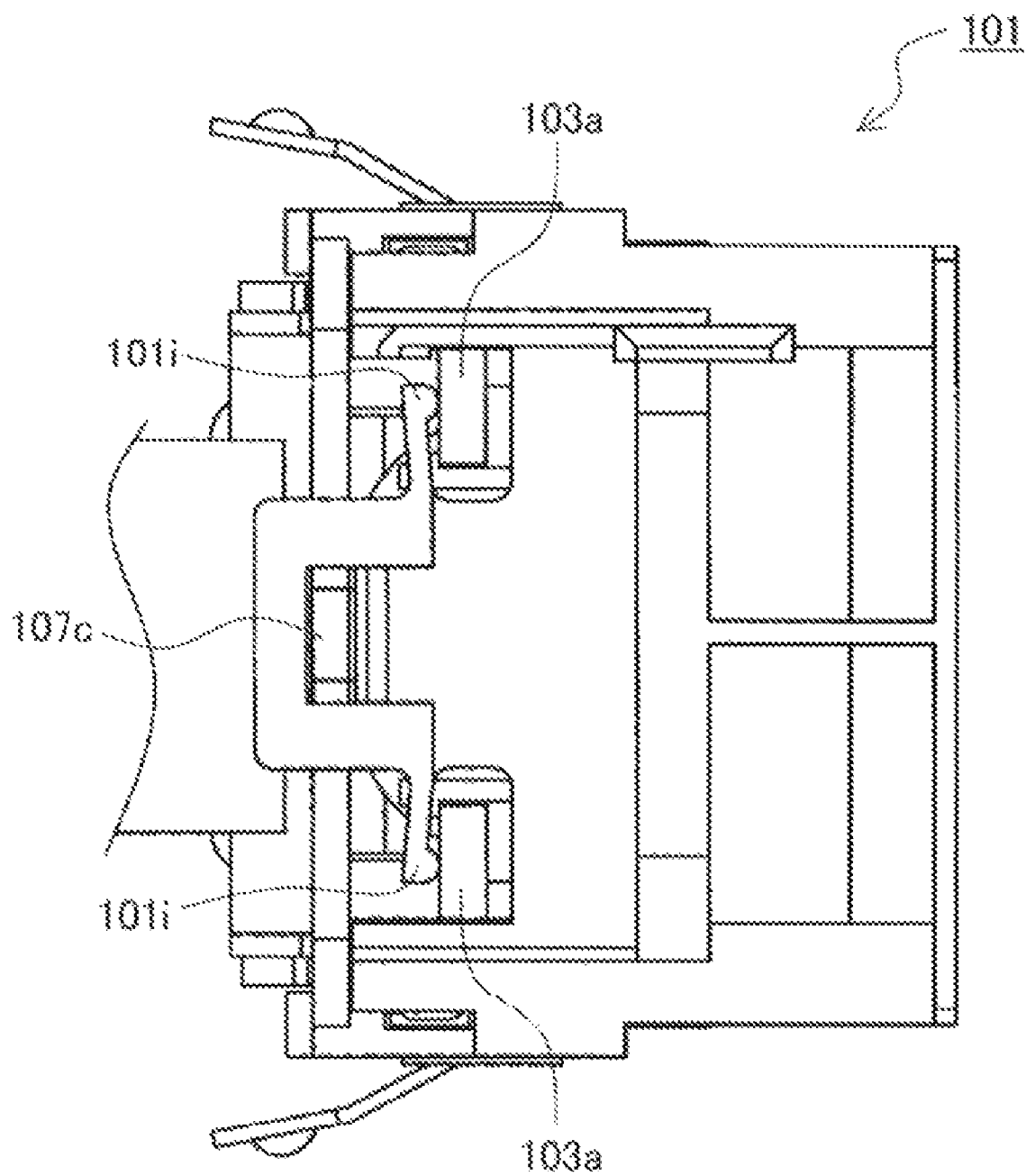
FIG. 7 is a plan view showing main portions of the image display device in Embodiment 1.

FIGS. 5 and 6 show a cross-section of the assembled EVF unit. FIG. 5 is a cross-sectional view taken along a vertical cross-sectional plane passing through an optical axis. FIG. 6 is a cross-sectional view taken along a horizontal cross-sectional plane passing through the optical axis. FIG. 7 is a plan view of a vicinity of the holding piece elastic arms 101i of the EVF unit viewed from a lower side. In FIG. 5, in order to express the configuration of the vicinity of the elastic support portion 101b and the holding piece elastic arms 101i in detail, the elastic support portion 101b, the holding piece elastic arms 101i, and the vicinity thereof are drawn in cross-sections thereof.

In FIGS. 5 and 6, the LCD holding piece 101 is provided with the positioning ribs 101h regulating the position of the LCD panel 102. However, the LCD panel 102 is formed by attaching a pair of glass substrates, so that it is difficult to keep a high outer shape size precision in the same way as in the LCD panel 2 described above. Therefore, it is necessary to form the positioning ribs 101h at positions where even the LCD panel 102 with a largest variation size can be accommodated. Thus, the clearance of the outer shape of the LCD panel 102 with respect to the positioning ribs 101h is large in the same way as in a conventional image display device.

However, in the configuration in which the BL unit 150 is inserted after the LCD panel 102 is inserted in the LCD holding piece 101 as in Embodiment 1, the insertion legs 103a are inserted in the holes 101a to engage the fixing hook 103b with the elastic support portion 101b, so that the holding piece elastic arms 101i bias the insertion legs 103a elastically as shown in FIG. 7. Furthermore, as shown in FIG. 5, the elastic support portion 101b biases the fixing hook 103b. Thus, at three portions in total including one portion in the elastic support portion 101b and two portions in the holding piece elastic arms 101i, the force of pressing the LCD panel 102 against the LCD receiving plane 101e via the BL unit 150 acts in a direction normal to the plane. Thus, the LCD panel 102 can be fixed previously to the LCD holding piece 101 with a friction force between planes (the surface of the LCD panel 102 and the LCD receiving plane 101e) before the EVF substrate 107 is incorporated. At this time, even if the LCD concave portion 101j is not formed, an end face edge of the LCD panel 102 is unlikely to the engaged with the LCD receiving plane 101e, and the LCD panel 102 is pressed against the LCD receiving plane 101e in a direction normal to the plane, so that the LCD holding piece 101 is unlikely to be shaved.

Thus, after the BL unit 150 is incorporated, for example, even in the case where the FPC portion 102a is inserted in the LCD connector 107a before the EVF substrate 107 is fixed to the LCD holding piece 101, the LCD panel 102 is positioned firmly.

[3. Operation of an Image Display Device]

First, the operation at a time when an image displayed on the LCD panel 102 is identified visually will be described.

In FIGS. 5 and 6, in the case where an image is displayed on the LCD panel 102, a control signal for displaying an image is input to the LCD panel 102 via the FPC 127b and the FPC 102a. Along with this, the light-emitting diode 107e emits light by being energized, and a light beam thereof reaches a back surface of the LCD panel 102 via the diffusion sheet 104, the BL polarizing plate 105, and the opening 106b. The light beam passes through the effective display region of the LCD panel 102, and thereafter, is output from the opening of the eyecap 130 via the opening in the LCD holding piece 101, the polarizing plate 108, the opening 109b, and the optical lens 114. Consequently, the user can identify visually an image displayed on the LCD panel 102 by peeping through the EVF unit from the eyecap 130 side.

Next, in order to adjust the visibility, the visibility adjustment knob 115 is rotated. By rotating the visibility adjustment knob 115, the pin 115a is moved in the cam groove 113a formed in the lens holder 113, and the lens holder 113 is moved in the optical axis direction. In the case of the present embodiment, in FIG. 2A, when the visibility adjustment knob 115 is rotated in a clockwise direction, the lens holder 113 is moved to the eyecap 130 side, and when the visibility adjustment knob 115 is rotated in a counterclockwise direction, the lens holder 113 is moved to the LCD panel 102 side. The user adjusts the EVF unit to a desired visibility by rotating the visibility adjustment knob 115 in a clockwise direction or a counterclockwise direction while peeping through the EVF unit from the eyecap 130 side.

[4. Effects of an Embodiment, Etc.]

According to the present embodiment, the LCD panel 102 can be positioned exactly, so that the sliding between the LCD panel 102 and the LCD holding piece 101 can be suppressed. This can prevent foreign matter such as debris from being generated, and can reduce remarkably a display defect frequency caused by mixing of foreign matter in a display region.

Furthermore, after the BL unit 150 is incorporated, for example, even in the case of inserting the FPC 102a in the LCD connector 107a before fixing the EVF substrate 107 to the LCD holding piece 101, the LCD panel 102 does not move, so that the end face of a glass substrate does not damage the LCD holding piece 101, whereby foreign matter can be prevented from being generated.

Furthermore, when the EVF substrate 107 is fitted in the LCD holding piece 101, the elastic arms 103c bias the EVF substrate 107 elastically, so that the EVF substrate 107 can be fixed without looseness. Thus, the generation of foreign matter such as debris caused by rubbing between the EVF substrate 107 and the LCD holding piece 101 or the BL piece 103 can be prevented.

Furthermore, as in Embodiment 1, the LCD holding piece 101 is provided with the LCD receiving plane 101e in a range smaller than an outer peripheral edge of the LCD panel 102, and the LCD concave portion 101j, which is a region that does not come into contact with the outer peripheral edge of the LCD panel 102, is formed on the periphery of the LCD receiving plane 101e. This can prevent the edge (which also may be referred to as an outer peripheral edge) of a glass substrate of the LCD panel 102 from shaving the LCD receiving plane 101e, so that the generation of foreign matter such as debris can be prevented. For example, in the case where the LCD concave portion 101j is not formed, the LCD panel 102 is pressed strongly against the LCD receiving plane 101e, the LCD panel 102 sinks slightly to the LCD receiving plane 101e, and the edge thereof is engaged with the LCD receiving plane 101e, with the result that foreign matter may be generated due to shaving. According to the configuration of Embodiment 1, even the slight possibility of the generation of such foreign matter can be avoided. Therefore, even if the LCD panel 102 moves when the LCD panel 102 is inserted in the LCD holding piece 101, or the light-emitting unit is inserted, the LCD holding piece 101 is not damaged by a sharp outer peripheral edge of the glass substrate. Furthermore, even before the light-emitting unit is incorporated, the generation of foreign matter can be prevented.

Furthermore, even in the case where the periphery of the LCD panel 102 becomes chipped or foreign matter adheres to or is mixed in the periphery, with the result that the foreign matter is mixed in a place other than an image display range, the difference in level between the LCD receiving plane 101e and the LCD concave portion 101j becomes an obstacle, which can prevent the foreign matter from moving to the image display range side with respect to the LCD concave portion 101j.

Furthermore, as in Embodiment 1, the LCD holding piece 101 is provided with the polarizing plate receiving plane 101f that comes into contact with the polarizing plate 108 in a range smaller than the outer peripheral edge of the polarizing plate 108, and the polarizing plate concave portion 101k, which is a region that does not come into contact with the outer peripheral edge of the polarizing plate 108, is formed on the periphery of the polarizing plate receiving plane 101f. According to this configuration, the edge of the polarizing plate 108 can be prevented from shaving the LCD pressure piece 106, so that foreign matter such as debris can be prevented from being generated. Furthermore, even in the case where foreign matter adheres to or is mixed in the periphery of the polarizing plate 108, with the result that the foreign matter is mixed in a place other than an image display range, the difference in level between the polarizing plate receiving plane 101f and the polarizing plate concave portion 101k becomes an obstacle, which can prevent the foreign matter from moving to the image display range side with respect to the polarizing plate concave portion 101k.

Furthermore, the LCD pressure piece 106 is provided with the LCD receiving plane 106c that comes into contact with the LCD panel 102 in a range smaller than an outer peripheral edge of the LCD panel 102, and a region that does not come into contact with the outer peripheral edge of the LCD panel 102 is formed on the periphery of the LCD receiving plane 106c. This configuration can prevent the edge of the LCD panel 102 from shaving the LCD pressure piece 106, so that the occurrence of foreign matter such as debris can be prevented.

The LCD panel 102 is not necessarily limited to the configuration in which two glasses are attached to each other, and liquid crystal is sealed therebetween, and the same effects are obtained whenever the outer peripheral edge is sharp. For example, a metal press component may be bonded to the periphery of glass.

Furthermore, the image display device is not necessarily limited to an LCD panel. Even if the image display device is of another system such as an electroluminescence display (EL display), a plasma display, or a field discharge display, the same effects are obtained whenever an outer peripheral edge has a sharp portion.

Furthermore, the BL unit 150 is not necessarily required to use a light-emitting diode. Even if the BL unit 150 uses an EL element and a fluorescent tube, the same effects are obtained. Furthermore, even if the BL unit 150 has a configuration in which ambient light is introduced with a prism, a lens, or the like, the same effects are obtained.

Furthermore, the material for the LCD holding piece 101 is not necessarily required to be a polyacetal resin, and even if the LCD holding piece 101 is made of other materials, for example, a resin excellent in mechanical strength such as a styrene-based resin and a carbonate-based resin, and a resin excellent in sliding properties such as a fluorocarbon resin, the same effects are obtained.

In Embodiment 1, the BL polarizing plate 105 and the polarizing plate 108 are described as the optical members placed on an optical path of a light beam. However, the optical members placed on an optical path of a light beam are not necessarily required to be plate-shaped optical members formed of a polarizing material that polarizes a light beam. The optical member may be, for example, a diffusion plate in which a diffusing agent for diffusing light of an LED that is a point light source in a large range is mixed, and even if the optical member merely is a transparent plate and lenses, the same effects are obtained.

In Embodiment 1, a holding portion, which is composed of the elastic support portion 101b and the holding piece elastic arms 101i, is placed in the LCD holding piece 101, and a portion to be held, which is composed of the insertion legs 103a and the fixing hook 103b, is placed in the BL unit 150. However, the same effects are obtained even if the holding portion is placed in the BL unit 150, and the portion to be held is placed in the LCD holding piece 101.

Furthermore, the elastic support portion 101b and the fixing hook 103b are placed on the upper side of the BL unit 150, and the holding piece elastic arms 101i and the insertion legs 103a are placed on the lower side of the BL unit 150. However, the same effects are obtained even if the holding piece elastic arms 101i and the insertion legs 103a are placed on the upper side of the BL unit 150, and the elastic support portion 101b and the fixing hook 103b are placed on the lower side of the BL unit 150.

Furthermore, although the elastic arms 103c are formed in the BL piece 103 in the present embodiment, the same effects are obtained even if the elastic arms 103c are formed on a plane of the EVF substrate 107 opposed to the BL unit 150.

Furthermore, in the LCD holding piece 101, although the polarizing plate concave portion 101k is formed in the vicinity of the polarizing plate receiving plane 101f, the polarizing plate concave portion 101k may not be formed. More specifically, an area defined by the outer periphery of the polarizing plate receiving plane 101f may be larger than an area defined by the outer periphery of the polarizing plate 108.

Furthermore, in the LCD pressure piece 106, although the area defined by the outer periphery of the polarizing plate contact plane 106d is set to be equal to or smaller than the area defined by the outer periphery of the polarizing plate 105, the area defined by the outer periphery of the polarizing plate contact plane 106d may be larger than the area defined by the outer periphery of the polarizing plate 105.

Furthermore, in the BL piece 103, although the area defined by the outer periphery of a plane that comes into contact with the polarizing plate 105 is set to be equal to or smaller than the area defined by the outer periphery of the polarizing plate 105, the area defined by the outer periphery of a plane that comes into contact with the polarizing plate 105 may be set to be larger than the area defined by the outer periphery of the polarizing plate 105.

[5. Another Configuration of an Image Display Device]

Figure 8:
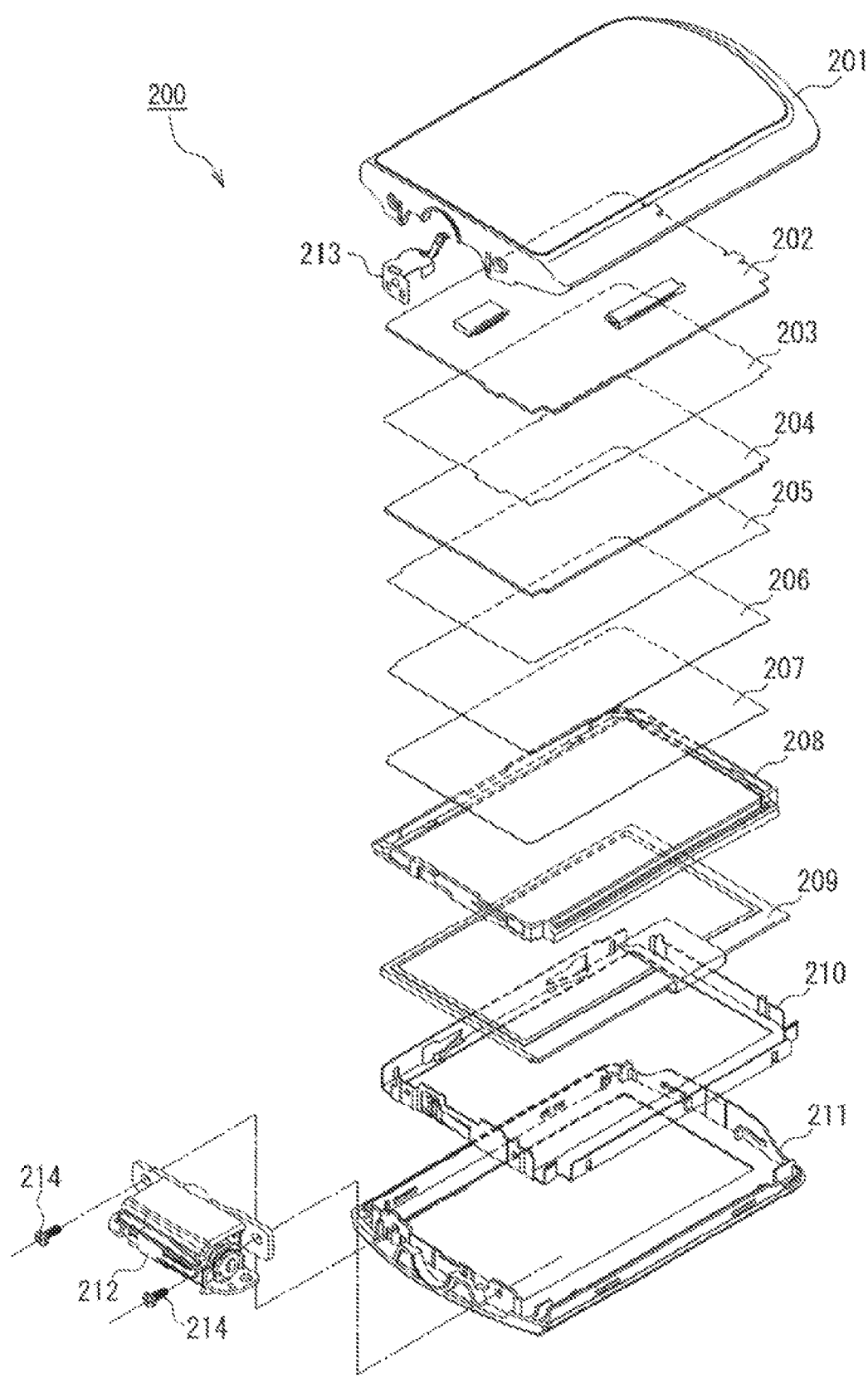
FIG. 8 is an exploded perspective view showing another example of the image display device in Embodiment 1.
Figure 9:
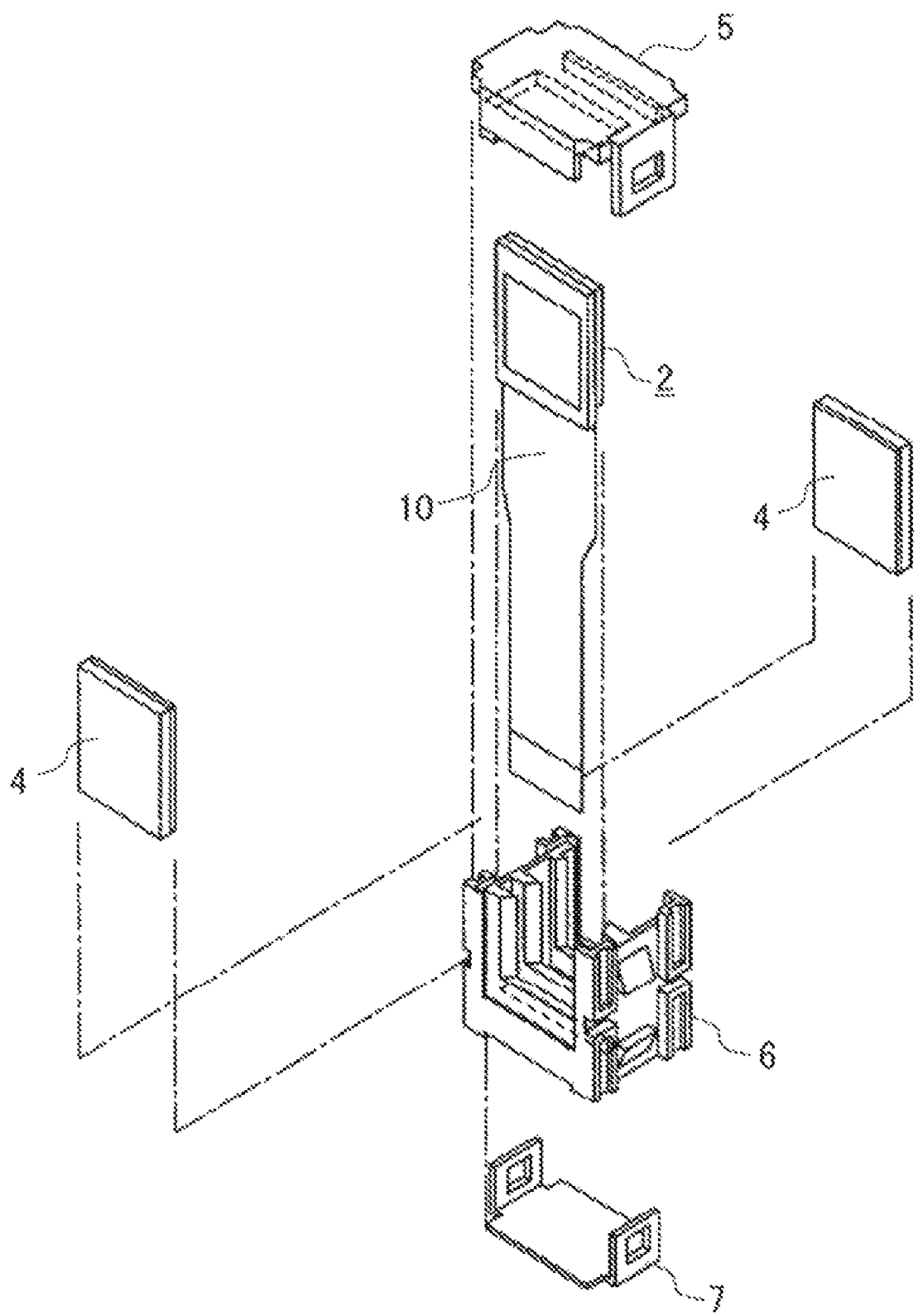
FIG. 9 is an exploded perspective view of an LCD unit in a conventional image display device.
Figure 10:
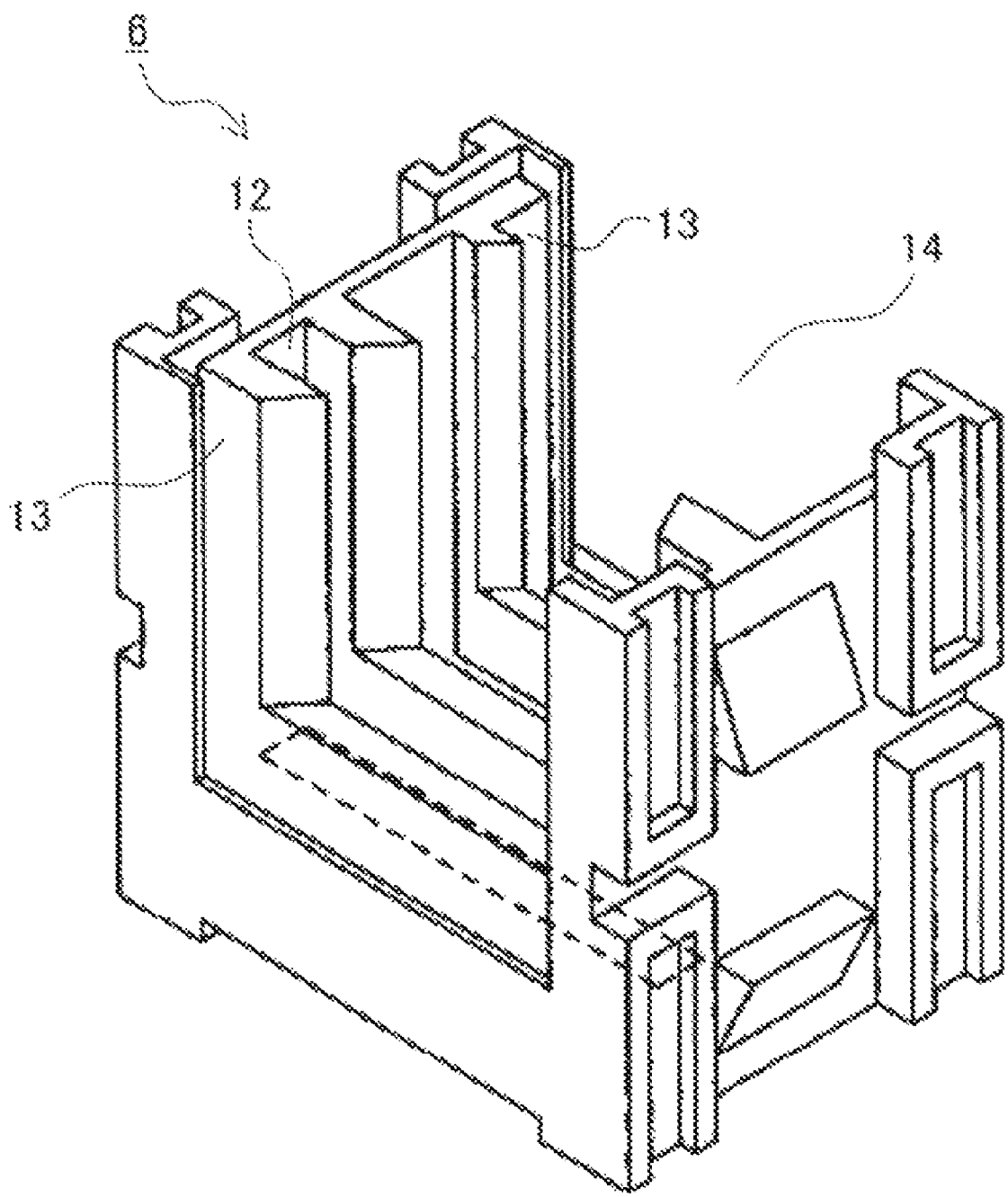
FIG. 10 is a perspective view of a housing lower portion in the conventional image display device.

The image display device of Embodiment 1 is not limited to an EVF to be mounted on a video camera, and also can be mounted on the liquid crystal monitor 23 shown in FIG. 1. The internal structure of the liquid crystal monitor 23 is configured as shown in FIG. 8.

FIG. 7 is an exploded perspective view showing a configuration of a general liquid crystal monitor to be mounted on a video camera or the like. As shown in FIG. 7, a liquid crystal monitor 200 includes a first LCD case 201, a substrate 202, a reflective sheet 203, a light-guiding plate 204, a diffusion sheet 205, a first polarizing sheet 206, a second polarizing sheet 207, a light-guiding plate holder 208, a liquid crystal panel 209, a shield case 210, a second case 211, a hinge unit 212, a ground plate 213, and screws 214. In the vicinity of one end face of the substrate 202, a backlight apparatus (not shown), for example, in which a plurality of light emitting elements such as LEDs are arranged, is mounted. On a surface side of the substrate 202 on which the backlight apparatus is mounted, the reflective sheet 203, the light-guiding plate 204, the diffusion sheet 205, the first polarizing sheet 206, the second polarizing sheet 207, and the liquid crystal panel 209 are placed in this order. The light-guiding plate holder 208 is formed in a frame shape and holds the light-guiding plate 204 with the diffusion sheet 205, the first polarizing sheet 206, and the second polarizing sheet 207 interposed between the light-guiding plate holder 208 and the light-guiding plate 204. The shield case 210 is formed of a conductive material such as metal and is formed in a frame shape, and protects the liquid crystal panel 209 from an unwanted radiation from outside. In the figure, the substrate 202 to the shield case 210 are accommodated in a case formed of the first LCD case 201 and the second LCD case 202. The ground plate 213 can dissipate static electricity with which the liquid crystal monitor 200 is charged to outside. The hinge unit 212 rotatably supports the liquid crystal monitor 200 with respect to a video camera body (not shown).

In FIG. 7, when a control signal is input to the liquid crystal panel 209, liquid crystal is driven based on the control signal to generate an image. Furthermore, a backlight apparatus mounted on the substrate 202 is lit with the control signal to be input. Light output from the backlight apparatus is incident upon the light-guiding plate 204 via a end side (exactly, an end face with an end being one side) of the light-guiding plate 204 opposed to one end side of the substrate 202 on which the backlight apparatus is mounted. The light-guiding plate 204 outputs light in a direction perpendicular to the plate surface of the light-guiding plate 204. Light output to the reflective sheet 203 side from the light-guiding plate 204 is totally reflected by the reflective sheet 203 to the first polarizing sheet 206 side via the light-guiding plate 204. The light output in a direction perpendicular to a plane of the light-guiding plate 204 is unified with light output to the first polarizing sheet 206 side, and is incident upon the diffusion sheet 205 to be diffused and become a plane light source. The light output from the diffusion sheet 205 is condensed in a normal direction perpendicular to each plane by the first polarizing sheet 206 and the second polarizing sheet 207. The polarization direction of light transmitted through the liquid crystal panel 209 is changed by these two polarizing sheets, whereby the switching function of the liquid crystal of the liquid crystal panel 209 is exhibited. The light output from the second polarizing sheet 207 is incident to the liquid crystal panel 209 from a back surface thereof and is output from a front surface thereof. On the liquid crystal panel 209, liquid crystal is driven with a display control signal input from a display control circuit (not shown) to generate an image, and the liquid crystal panel 209 is irradiated with light from behind, thereby performing a display.

In the liquid crystal monitor 200 thus configured, the liquid crystal panel 209 is interposed between the first LCD case 201 and the second LCD case 211 via various sheets. At this time, due to the presence of means for biasing the first LCD case 201 to the second LCD case 211 side, or means for biasing the second LCD case 211 to the first LCD case 201 side, the liquid crystal panel 209 can be positioned without looseness, and the rubbing between the liquid crystal panel 209 and another member can be prevented. Thus, foreign matter such as debris can be prevented from being generated. For example, there is the following configuration: the first LCD case 201 includes members corresponding to the elastic fixing arm 101*b* and the holding piece elastic arms 101*i* shown in FIG. 3, the second LCD case 211 includes members corresponding to the insertion legs 103*a* and the fixing hook 103*b* shown in FIG. 2D, and the first LCD case 201 and the second LCD case 211 are engaged with each other, whereby the first LCD case 201 and the second LCD case 211 are coupled to each other using a biasing force.

Furthermore, in the light-guiding plate holder 208, the plane in contact with the liquid crystal panel 209 can be formed so that the area defined by the outer periphery of the plane is equal to or smaller than the area defined by the outer periphery of the liquid crystal panel 209. With such a configuration, foreign matter can be prevented from moving to an image display range side. Furthermore, the relationship between areas of the contact planes as described above is not limited to a contact portion between the light-guiding plate holder 208 and the liquid crystal panel 209, and the same effects can be obtained by allowing another contact portion to have a similar relationship. For example, the relationship is effective for a contact portion between the first LCD case 201 and the substrate 202, and a contact portion between the shield case 210 and the second LCD case 211. The relationship is effective particularly in the case where at least one of two members to be in contact with is formed of a material having a high possibility of generating debris due to rubbing, such as a resin.

According to the above configuration, foreign matter can be prevented from being generated by rubbing between the liquid crystal panel 209 and another member, and a display defect frequency caused by mixing of foreign matter in a display region can be reduced remarkably. The same effects as those obtained by the configuration of the above EVF can be obtained in the other configuration.

The configuration of the liquid crystal monitor 200 shown in FIG. 7 is an example, and the same effects are obtained even in a liquid crystal display device with a different configuration. More specifically, in a liquid crystal display device having a configuration in which at least the liquid crystal panel 209 is positioned by being interposed from front and back sides, the same effects are obtained irrespective of an embodiment to which an image display device is applied, such as a mobile telephone terminal, a digital still camera, and a liquid crystal television receiver. The same effects are obtained irrespective of the size of a display area.

Furthermore, the liquid crystal monitor 200 of the present embodiment has a configuration in which the liquid crystal panel 209 is mounted. However, the same effects are obtained even in the configuration in which a display device in a plate shape such as an EL display panel and a plasma display panel is mounted.

INDUSTRIAL APPLICABILITY

An image display device of the present invention can suppress the generation of foreign matter and substantially reduce a display defect frequency of an image, so that the image display device is useful for an EVF and a liquid crystal monitor to be mounted on a video camera, a still camera, and a mobile telephone. Furthermore, the image display device also is useful for a liquid crystal display, an organic EL display, or the like, which is an image display device as a single appliance.

Among them, the image display device of the present invention is useful particularly in an apparatus for enlarging a display image with an optical lens as in an EVF.

The invention claimed is:

1. An image display apparatus, comprising:
   an image display device;
   a holding member having a first contact plane to be in contact with a display plane of the image display device; and
   a lid having a second contact plane to be in contact with a plane of the image display device opposed to the display plane,
   wherein the holding member includes a biasing portion that biases the lid,
   the biasing portion comprising a holding elastic arm formed on a lower side of said holding member and an elastic support portion formed on the upper side of said holding member,
   the lid includes an engaging portion that engages the biasing portion,
   the engaging portion comprising insertion legs on the lower portion of the lid and a fixing hook on the upper portion of the lid, and
   the lid is biased in a direction normal to the first contact plane by the biasing portion.

2. The image display apparatus according to claim 1, wherein an area defined by an outer periphery of the second contact plane is equal to or smaller than an area defined by an outer periphery of the image display device.

3. The image display apparatus according to claim 1, wherein an area defined by an outer periphery of the first contact plane is equal to or smaller than an area defined by an outer periphery of the image display device.

4. The image display apparatus according to claim 1, wherein the lid is accommodated in the holding member.

5. The image display apparatus according to claim 1, wherein the lid includes an opening transmitting a light beam emitted by a light source.

6. The image display apparatus according to claim 5,
   wherein the lid includes a light source side lid on a side of the light source, and a display device side lid on a side of the image display device,
   the image display device includes a polarizing plate between the light source side lid and the display device side lid, and
   an area defined by an outer periphery of a third contact plane to be in contact with the display device side lid and the polarizing plate is equal to or smaller than an area defined by an outer periphery of the polarizing plate.

* * * * *